US012774022B2

(12) United States Patent
Ketterer

(10) Patent No.: US 12,774,022 B2
(45) Date of Patent: Oct. 27, 2026

(54) PRODUCE PACKING CART

(71) Applicant: Four Growers, Inc., Turtle Creek, PA (US)

(72) Inventor: Justin Marcus Ketterer, Pittsburgh, PA (US)

(73) Assignee: Four Growers, Inc., Turtle Creek, PA (US)

( * ) Notice: Subject to any disclaimer, the term of this patent is extended or adjusted under 35 U.S.C. 154(b) by 311 days.

(21) Appl. No.: 18/537,210

(22) Filed: Dec. 12, 2023

(65) Prior Publication Data

US 2024/0190489 A1 Jun. 13, 2024

Related U.S. Application Data

(60) Provisional application No. 63/432,082, filed on Dec. 13, 2022.

(51) Int. Cl.
*B62B 3/02* (2006.01)

(52) U.S. Cl.
CPC ............ *B62B 3/02* (2013.01); *B62B 2203/07* (2013.01); *B62B 2203/70* (2013.01)

(58) Field of Classification Search
CPC ... B62B 3/02; B62B 2203/07; B62B 2203/70; B62B 3/04; B62B 3/002; B62B 3/005; B62B 2202/12; B62B 2207/02; B62B 2203/073; B62B 2203/74; B62B 2202/90; B62B 3/108; B62B 5/0069; B62B 5/0093
USPC .................... 187/244, 269, 243, 272; 53/531
See application file for complete search history.

(56) References Cited

U.S. PATENT DOCUMENTS

| | | | | | |
|---|---|---|---|---|---|
| 592,982 | A * | 11/1897 | Cassady | B66F 9/07 187/244 |
| 8,033,084 | B1 * | 10/2011 | Peterson | B65B 5/10 53/473 |
| 11,203,118 | B1 * | 12/2021 | McDowall | B25J 9/0084 |
| 2005/0095330 | A1 * | 5/2005 | Guido | A23B 7/00 426/324 |
| 2010/0038181 | A1 * | 2/2010 | Jones | B66F 7/28 187/244 |
| 2014/0212257 | A1 * | 7/2014 | Yamashita | B65G 1/0492 414/807 |
| 2018/0057283 | A1 * | 3/2018 | Peters | B25J 18/025 |
| 2020/0215955 | A1 * | 7/2020 | Aljallis | B60P 3/007 |

FOREIGN PATENT DOCUMENTS

| | | |
|---|---|---|
| DE | 19540855 C2 | 7/2002 |
| WO | WO 2020/160208 A1 | 8/2020 |
| WO | WO 2021/071920 A1 | 4/2021 |

* cited by examiner

*Primary Examiner* — Jacob A Smith
(74) *Attorney, Agent, or Firm* — Wolf, Greenfield & Sacks, P.C.

(57) ABSTRACT

Embodiments related to a produce harvesting system including a robotic limb, a vacuum source, an end effector for picking produce are disclosed. Additionally, embodiments related to methods and systems for planning movement paths for the end effector and controlling operation of a produce packing cart are disclosed.

8 Claims, 24 Drawing Sheets

PRODUCE PACKING CART

RELATED APPLICATIONS

This application claims priority under 35 U.S.C. § 119(e) to U.S. Application Ser. No. 63/432,082, filed Dec. 13, 2022, the content of which is incorporated herein by reference in its entirety for all purposes.

FIELD

Disclosed embodiments are related to produce packing carts and related methods of use.

BACKGROUND

The increasing human population is causing an increase in the demand for food, much of which is produced by the farming industry. Labor supply is an ongoing issue in the farming industry. Accordingly, automation solutions are being developed to address labor issues within the farming industry including the harvesting and storing of produce.

SUMMARY

In some embodiments, an end effector for picking produce comprises a tube including an opening formed in a distal end portion of the tube and a channel extending through the tube, wherein the tube is configured to be attached to a vacuum source. The end effector further comprises one or more detents attached to the tube and extending into the channel, wherein the one or more detents are configured to move between a retracted configuration and an extended configuration to change an area of the channel extending past of the one or more detents.

In some embodiments, a produce harvester comprises a robotic limb, a vacuum source, and an end effector configured to pick produce. The end effector comprises a tube including an opening formed in a distal end portion of the tube and a channel extending through the tube, wherein the tube is configured to be attached to a vacuum source. The end effector further comprises one or more detents attached to the tube and extending into the channel, wherein the one or more detents are configured to move between a retracted configuration and an extended configuration to change an area of the channel extending past of the one or more detents.

In some embodiments, a method of harvesting produce comprises positioning an opening of a channel of an end effector adjacent to a product, applying a vacuum to the channel of the end effector, biasing one or more detents positioned within the channel of the end effector towards an extended configuration with the vacuum, and moving the one or more detents towards a retracted configuration as the product moves through the channel past the one or more detents.

In some embodiments, a produce collector comprises a housing including an interior volume, a produce inlet formed in the housing configured to receive produce, and a deceleration device configured to decelerate the produce as the produce enters the interior volume.

In some embodiments, a method of collecting produce comprises applying a vacuum to an interior volume of a housing of a collection device to move produce into the interior volume and decelerating the produce with a deceleration device disposed in the interior volume to decelerate the produce prior to the produce falling into a bottom portion of the interior volume relative to a direction of gravity.

In some embodiments, a produce packing cart comprises a plurality of shelves disposed at different vertical positions, wherein each shelf of the plurality of shelves is configured to support one or more containers disposed therein, and wherein each shelf includes a first opening on a first side of the plurality of shelves and a second opening on a second side of the plurality of shelves opposite from the first side. The produce packing cart further comprises a first elevator associated with the first side of the plurality of shelves, a second elevator associated with the second side of the plurality of shelves, and one or more actuators configured to move a container disposed on one of the first and second elevators into an adjacent shelf of the plurality of shelves, and wherein moving the container into the adjacent shelf moves one of the one or more containers disposed in the adjacent shelf onto the other of the first and second elevators.

In some embodiments, a method of packing produce comprises moving a filled container disposed on a first elevator into an adjacent first shelf of a plurality of shelves, wherein moving the filled container into the first shelf moves a first unfilled container disposed in the first shelf onto a second elevator.

In some embodiments, a method for path planning of an end effector to harvest produce comprises obtaining three-dimensional data related to produce to be picked, performing a cluster analysis on the three-dimensional data to identify one or more clusters of produce, and generating one or more paths for movement of the end effector based at least in part on the one or more clusters of produce, wherein the one or more paths extend through one or more pieces of produce.

In some embodiments, a harvesting system comprises a robotic arm including an end effector configured to harvest produce, one or more sensors configured to obtain three-dimensional data relating to the produce, and at least one processor. The at least one processor is configured to perform a cluster analysis on the three-dimensional data to identify one or more clusters of produce and generate one or more paths for movement of the end effector based at least in part on the one or more clusters of produce, wherein the one or more paths extend through one or more pieces of produce.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
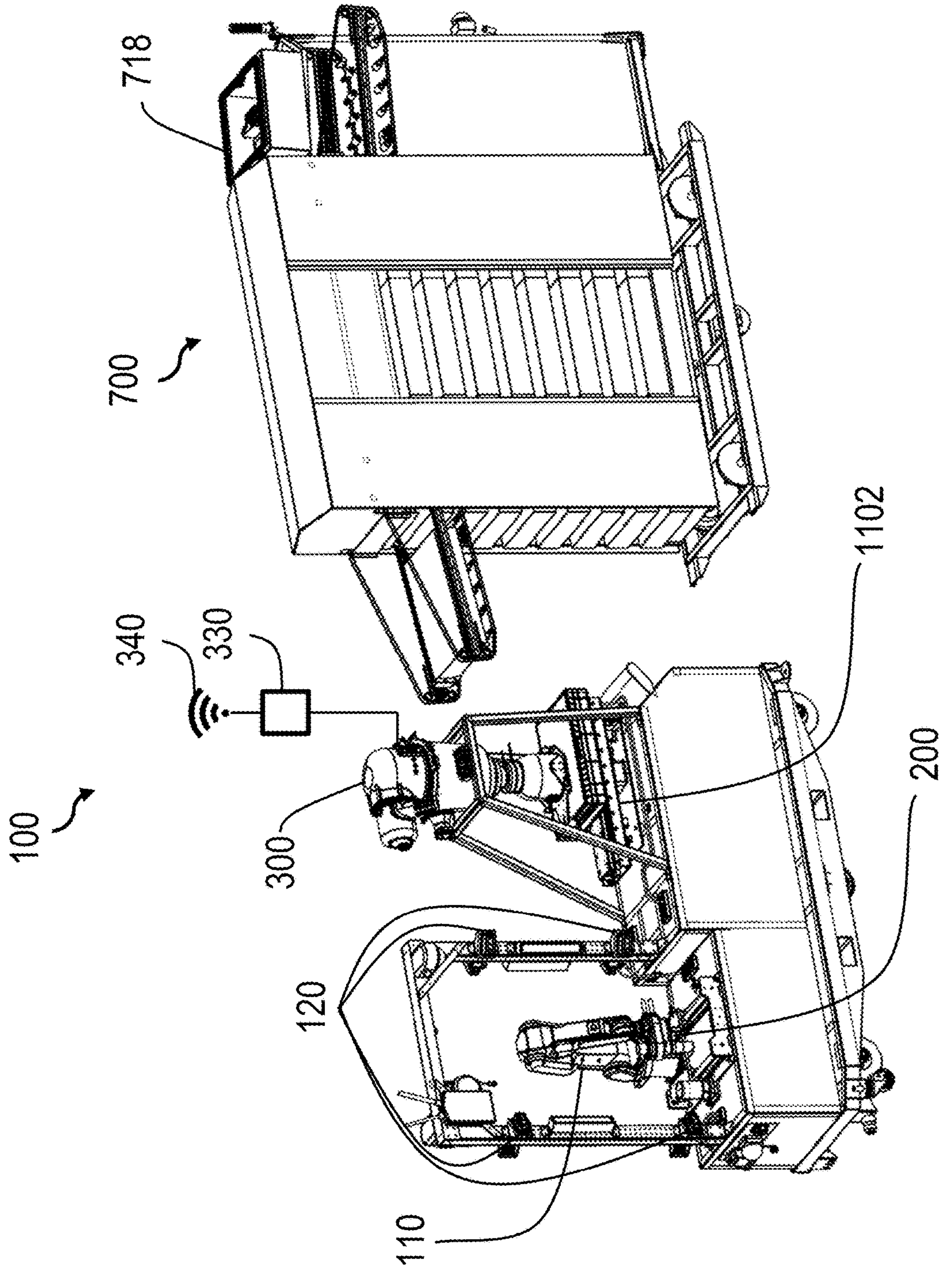
FIG. 1 is a perspective view of a produce harvesting system according to some embodiments.

The inventors have recognized that enclosed farming areas such as a greenhouse may inherently possess advantageous traits for industrial farming automation given the humid and warm conditions present in greenhouses that may present challenges to laborers. For example, greenhouses may have relatively flat and predictable floors which allow for easier navigation of wheeled devices through the greenhouse compared to other environments. Greenhouses may also have consistent reliable internet and/or local network connection throughout their areas to allow for automated devices to have a consistent internet and/or network connection throughout the greenhouse area. Greenhouses may also permit the use of well-organized crop layouts, allowing for predictable and repeatable automated harvesting with crops organized in aisles, rows, and/or any other repeating pattern or arrangement that may be beneficial for use with automation solutions. In some embodiments, greenhouses may also enable hydroponic growing of crops. Additionally, greenhouses may be controlled for climate conditions such as temperature and humidity or any other climate condition which may avoid complications and drawbacks, such as electrical and mechanical damage, that could arise from uncontrolled climate conditions. Of course, other potential benefits associated with deploying robots within greenhouses may also exist, though it should be understood that the current disclosure is not limited to only being used in greenhouses.

While the inventors have recognized the many advantages to automating harvesting in greenhouses and other environments, current automated produce harvesting and storage systems do not adequately address the problems or needs encountered within greenhouses and/or other environments. For example, the cost of existing automation solutions for greenhouses and other farming environments are relatively high and the harvesting often occurs too slowly to be commercially viable due to the difficulty associated with the task of identifying, appropriately harvesting, and storing of the produce in these complex environments. However, the Inventors have recognized that improvements in computer processing capabilities and decreased cost of robotic limbs are helping to make automatic harvesting solutions viable, though appropriate produce harvesting system and storage designs as well as methods for controlling these systems are needed.

Current imaging techniques may not accurately predict the size of produce to be harvested, and it may be difficult to control typical end effectors to harvest produce of varying size and/or shape while both accurately and quickly harvesting the produce. Accordingly, the Inventors have recognized the benefits associated with the use of end effectors and methods for harvesting produce of varying size without the need for determining an exact size of the produce to be harvested. For example, systems and methods disclosed herein may use an end effector with a variably sized channel that may automatically change size to apply a desired suction force on the produce based on a size of the produce to be harvested. This variably sized channel may extend at least partially between a distal opening of the end effector and a vacuum port of the end effector that is configured to be connected to a vacuum source.

Produce may be harvested by an end effector by positioning an opening of a distal end portion of the end effector adjacent to the produce with vacuum pressure being applied to the end effector. The end effector may be connected to a suction line that is axially aligned with the opening in some embodiments. At the time of harvesting, the produce may initially be disposed adjacent to, or partially within, the opening to the channel of the end effector. Positioning the end effector such that the produce to be harvested is at least partially disposed within the channel portion may apply a suction force to the produce due to the vacuum pressure (i.e., negative pressure relative to the surrounding environment) present in the channel of the end effector during operation.

If a size of a channel of an end effector is not appropriately matched to a size of the produce to be harvested, excessive flow leakage around the produce may occur during harvesting with the disclosed vacuum based end effectors. Accordingly, it may be desirable to change a size of at least a portion of the channel based on a size of the produce being harvested as noted above to reduce this leakage to appropriate levels to avoid impractical power requirements, operating cost, and/or complexity for the harvesting systems. In the presently disclosed methods and systems, produce may be harvested through the use of movable detents disposed within the channel that may be automatically moved between a retracted configuration and an at least partially extended, and in some instances fully extended, configuration when a suction force is applied to the detents. This may automatically control the size of the channel when produce is inserted into the portion of the channel including the detents which may increase the suction force applied to the produce due to the reduced leakage around the produce. For example, in some embodiments, reducing the leakage area around a piece of produce by one half may increase the suction force applied to the produce my approximately four times.

As noted above, in some embodiments, an end effector may include detents coupled a portion of the end effector including the channel used to harvest produce. Further, during operation, the detents may be biased from a retracted configuration towards and an extended configuration due to the applied suction forces. Each detent may be contained within and move freely within a cavity disposed in the tube, or other structure of an end effector, where at least a portion of each detent may extend into the channel of the end effector. The cavities disposed in the tube may extend through a portion of or entirely through the tube. The detents and/or cavities may be arranged in an axially symmetric or non-symmetric arrangement relative to a longitudinal axis of the distal end portion of the end effector. Each of the cavities may also be configured to retain the detents at least partially disposed within the cavity using mechanically interlocking features, captured fasteners, bearings, hinges, compliant connections, and/or any other appropriate connection that permits the detents to move relative to the channel of the end effector. The detents may also be biased to the extended or retracted configuration via a biasing mechanism such as a spring.

To avoid damage to produce during harvesting, it may be desirable to include various features on the detents to reduce the potential for damage to produce. Such geometric features may include a ramp, slope, taper, or fillet on one or more portions of a detent configured to contact produce entering the channel of an end effector. It may also be desirable for produce being harvesting to experience a highest force due to vacuum pressure when proximal to the opening of the end effector and experience a reduced force as the produce travels through the end effector. This change in force may allow for a reduced or zero acceleration of the produce being harvested after passing through an initial portion of the end effector. Such reduction in acceleration may help to limit the velocity and overall kinetic energy of the produce being harvested which may reduce the potential for damage to the produce due to impact. To provide this reduced acceleration after harvesting, a transverse dimension of a portion of the channel located proximal to the one or more detents may have a transverse dimension (e.g., a diameter) that is greater than a transverse dimension of the variably sized portion of the channel. This may result in an increase in cross-sectional area as the produce being harvested travels through the end effector and an associated vacuum line which may reduce the force applied to the produce as the produce travels through the produce harvester.

In some embodiments, a transverse dimension of a variably sized portion of a channel of an end effector while the detents are in the retracted configuration may range from 1 inch to 3 inches. For example, in some embodiments, the minimum transverse dimension (e.g., diameter) perpendicular to a longitudinal axis of the channel while the detents are in the retracted configuration may be greater than or equal to 2 cm, 3 cm, 4 cm, 5 cm, and/or any other appropriate dimension. The minimum transverse dimension of the channel may also be less than or equal to 8 cm, 7 cm, 6 cm, 5 cm, and/or any other appropriate dimension. For example, a minimum transverse dimension of the channel with the detents in the retracted configuration may be between or equal to 2 cm and 8 cm. In some embodiments, the minimum transverse dimension of the end effector when the detents are in the extended configuration may be greater than or equal to 0.5 cm, 1 cm, 1.5 cm, 2 cm, 3 cm, 4 cm, 5 cm, and/or any other appropriate dimension. The minimum transverse dimension of the end effector when the detents are in the extended configuration may also be less than or equal to 6 cm, 5 cm, 4 cm, and/or any other appropriate dimension. Combinations of the foregoing are contemplated. For example, the minimum transverse dimension of the channel of the detents in the extended configuration may be between or equal to 0.5 cm and 6 cm. While particular combinations and ranges of dimensions are provided above, ranges both greater and less than those noted above are also contemplated as the disclosure is not so limited.

It should be understood that an end effector may include any appropriate number of detents disposed at least partially within a channel of the end effector. For example, in some embodiments, the end effector may include between or equal to 1 detent and 24 detents disposed in the channel portion. For example, in some embodiments, the end effector may include 1, 2, 4, 6, 8, 10, 12, 14, 16, 18, 20, 24, or any other appropriate number of detents. In some embodiments, there may be an equivalent number of cavities as detents. In some embodiments, the detents may have a length extending along a length of the channel of the end effector that is between or equal to 2.5 cm and 8 cm though other lengths may also be used. In some embodiments, the detents may have a width that is between or equal to 0.25 cm and 1.5 cm. Of course, it should be understood that end effectors with different numbers of detents and/or detents with dimensions both greater and less than those noted above are also contemplated as the disclosure is not so limited.

In some embodiments, the vacuum pressure applied to an end effector relative to a surrounding atmospheric pressure by a corresponding vacuum source may be between about −15 kPa to −5 kPa. For example, in some embodiments, the pressure applied to the end effector relative to the surrounding atmospheric pressure may be between or equal to about −15 kPa and −5 kPa, −15 kPa and −10 kPa, and/or any other appropriate pressure differential. Additionally, other combinations of the above-noted ranges may be suitable. Ranges both greater and less than those noted above are also contemplated as the disclosure is not so limited.

In some embodiments, an end effector may be configured to harvest tomatoes, apples, and/or any other desired type of produce. In embodiments where tomatoes are harvested, the tomatoes may include varieties of tomatoes including snacking tomatoes, cocktail tomatoes, and any other variety of tomato. Snacking tomatoes may include cherry tomatoes, grape tomatoes, and any other tomato variety that are of the snacking size (i.e., small relative to other tomato varieties such as cocktail tomatoes). Depending on the type of tomato or apple, different sizes and/or masses of the individual produce may be experienced. For example, cocktail tomatoes may be larger and have a higher mass on average than snacking tomatoes. In view of the above, a piece of produce may have a mass that is greater than or equal to about 5 grams (g), 10 g, 15 g, 20 g, 30 g, 50 g, 60 g, 80 g, 100 g, 150 g, 200 g, 500 g, 1000 g, and/or any other appropriate mass. Correspondingly, the produce may have a mass that is less than or equal to 2000 g, 1000 g, 500 g, 200 g, 150 g, 100 g, 80 g, 60 g, 50 g, and/or any other appropriate mass. Combinations of the above ranges are contemplated. For example, in one such embodiment, snacking tomatoes may have range in mass from 7 grams to 20 grams, and in some instances about 10 grams. Correspondingly, cocktail tomatoes may range in mass from about 10 grams to 40 grams, including, for instance, about 30 grams. In some embodiments, apples may range in mass from about 20 grams to 500 grams, including for example about 80 grams. While specific ranges are provided above, ranges both greater and less than those noted above are also contemplated as the disclosure is not so limited.

In view of the large variations in size that may be experienced depending on the specific produce being harvested, it may be desirable to use different end effectors with different sizes for different types of produce. In one such embodiment, an end effector may be designed to harvest one variety of produce and may be removably coupled with a robotic limb. When it is desired to harvest a different produce, a different end effector designed to harvest the different produce may be removably coupled to the robotic limb. For example, an end effector may be designed to harvest snacking tomatoes and another end effector may be designed to harvest cocktail tomatoes. When it is desired to harvest snacking tomatoes, the end effector designed to harvest snacking tomatoes may be coupled to the robotic limb, and when it is desired to harvest cocktail tomatoes, the end effector designed to harvest cocktail tomatoes may be coupled to the robotic limb. The differences among the end effectors may include one or more geometric dimensions of the end effectors, such as diameter and/or length of the channel portion, length and/or width of the detents, and/or other structural differences as the disclosure is not limited in this fashion. This interchangeable use of different end effectors may help to permit harvesting of multiple varieties of produce with relatively low cost and complexity. To help facilitate the selectively coupling of the end effector to a corresponding robotic limb, brackets, fasteners, magnetic connections, mechanically interlocking features, and/or any other appropriate removable coupling may be used. Of course, it should be understood that embodiments in which permanent couplings between an end effector and robotic limb are used are also contemplated.

The Inventors have recognized that harvesting of produce with a vacuum may present the possibility of damaging the produce if the produce is subject to sudden decelerations after the produce has been harvested. Damaged produce may be more subject to rot, may not be as desirable to consumers, and/or may be discarded as waste. Thus, the Inventors have recognized the benefits associated with vacuum based produce harvesters that are configured to avoid damaging the produce during harvesting. The collection device may include a housing including an interior volume, an inlet coupled to interior volume of the housing configured to receive produce, a vacuum port configured to be fluidly coupled to a vacuum source, and a deceleration device disposed in the interior volume. The deceleration device may be any appropriate device configured to decelerate produce as it enters the interior volume. For example, the deceleration device may include a flexible sheet as described relative to the figures. However, other types of deceleration devices may also be used. For instance, the deceleration device may include one or more springs coupled to one or more stiff sheets configured to contact and decelerate produce entering the interior volume. The springs and stiff sheets may be located in one or more appropriate portions of the produce collector. In another example, produce may be decelerated by altering (e.g., decreasing) airflow experienced by the produce upon entering some portion of the produce collector. Baffles and/or increased diameter (i.e., increased cross-sectional area) in one or more portions of the produce collector (e.g., produce inlet) may be used at least in part to alter the airflow experienced by the produce. For example, baffles may reduce the airflow experienced by produce entering the produce collector by allowing air to flow behind the produce as it enters a portion of a conduit attached to the interior volume and/or a portion of the produce collector prior to entering the interior volume, thereby decreasing the suction pressure experienced by the produce and slowing the produce down. In a related manner, the use of increased conduit and/or other channel diameters the produce passes through prior to entering the interior volume may allow for additional leakage of air past the produce also resulting in less suction pressure being applied to the produce which may slow the produce down. For the sake of clarity, the figures describe and show the use of a flexible sheet. However, any of the previously mentioned deceleration devices could be used to decelerate the produce upon entering the interior volume. The various deceleration devices may also be used with any of the embodiments disclosed herein. Further, it should be understood that any appropriate type of deceleration device capable of slowing down the produce without damaging the produce may be used as the disclosure is not limited in this fashion.

As noted above, in some embodiments, the deceleration device may be a flexible sheet. In such an embodiment, the flexible sheet may extend at least partially around a cross-sectional perimeter of the interior volume of the housing and at least partially along a length of the interior volume. The flexible sheet may be configured such that produce entering the interior volume of the housing through the produce inlet is captured in the flexible sheet prior to falling into a bottom portion of the interior volume relative to a direction of gravity. The flexible sheet may deform when a piece of produce impacts the flexible sheet. Due to the sheet being flexible and being configured to move relative to the interior volume, the flexible sheet may decelerate the produce as it enters the interior volume of the collection device which may help to reduce the incidence of damage to the produce. Specifically, kinetic energy may be transferred from the produce to the flexible sheet as the flexible sheet is deformed, thereby reducing the kinetic energy associated with the produce. This transfer of kinetic energy may decelerate the product more gradually than if it were to impact a rigid surface, which again, may help reduce the incidence of damage to the harvested produce. After being caught in the flexible sheet, the collected produce may fall into a bottom portion of the interior volume.

In some embodiments, the bottom portion of the interior volume of the produce collector may have a volume to store a desired amount of produce. In some embodiments, the bottom portion may store a volume of produce ranging from about 500 $cm^3$ to 20,000 $cm^3$. For example, in some embodiments, the bottom portion may store about 8,000 $cm^3$ of produce. In some embodiments, the bottom portion of the interior volume may also be configured to store 300 grams to 12,200 grams of produce. Ranges both greater and less than those noted above are also contemplated as the disclosure is not so limited.

Automatic harvesting may yield a relatively high volume of produce being harvested. Therefore, the inventors have recognized that it may be desirable to also provide an automated produce packing cart for storing harvested produce in some embodiments. For example, produce may be deposited into containers, which may correspond to any appropriate type of storage medium configured to hold the produce, during harvesting of a desired produce and the containers may be stored in a frame or other housing including shelves configured to support the containers.

Unfilled containers may be provided to the automatic harvesting system by a produce packing cart and containers filled with produce may be removed from the automatic harvesting system and stored in the produce packing cart. The packing cart may automatically store the filled containers and automatically provide the unfilled containers to the produce harvesting system as detailed further below and in the figures.

In some embodiments, a packing cart may include a frame and/or housing having a plurality of shelves which hold the unfilled and/or filled containers. The shelves may be vertically aligned, with each shelf disposed at a different vertical position. Each shelf may be configured to hold one or more containers. The shelves may include rails, rollers, bearings, wheels, supporting surfaces with sufficiently low friction, and/or any other appropriate type of construction capable of supporting the containers while permitting the containers to slide into and out of the shelves. The packing cart may include first and second elevators that may be positioned at opposing sides of the plurality of shelves and may be configured to move to any vertical position between a bottom shelf to a top shelf. Thus, each elevator may be configured to be positioned adjacent to any shelf. The elevators may be operated using one or more actuators which may include one or more components selected from motors, linear actuators, pulleys, rails, leadscrews, chains, belts, shafts, wire ropes, solenoids, and/or any other appropriate type of actuator capable of controlling a vertical position of the associated elevator. The elevators may also include one or more container actuators configured to move one or more containers disposed on the elevator into an adjacent shelf. In some embodiments, using one or more cables to actuate the elevators and/or container actuators may be preferred. Using cables may allow for containers of different sizes to be used on the same system without significant changes to the produce harvesting system and/or produce packing cart. Additionally, using cables for actuation may allow for actuation within a relatively compact space compared to other actuation devices. However, other appropriate types of actuators that do not use cables are also contemplated.

As noted above, during operation, the first elevator may be associated with a first side of the shelves, and the second elevator may be associated with a second opposing side of the shelves. Moving the one or more containers into the adjacent shelf from the first elevator may move one or more containers disposed on the adjacent shelf onto the second elevator. Similarly, moving the one or more containers into the adjacent shelf from the second elevator may move one or more containers disposed on the adjacent shelf onto the first elevator. This process of moving filled and unfilled containers into the shelves may be used to both fill the packing cart with filled containers and to supply empty containers to the associated harvesting system for filling.

Depending on the size of a packing cart and desired application, each shelf of the produce packing cart may be configured to contain any number of filled and/or unfilled containers. For example, in some embodiments, the shelves may be configured to contain 1 to 3 unfilled and/or filled containers. However, shelves including numbers of containers greater than those noted above are also contemplated as the disclosure is not limited to any particular shelf capacity.

Depending on various operating requirements, a produce packing cart may include any appropriate number of shelves arranged in a vertical stack or other appropriate arrangement. For example, a produce packing cart may include between or equal to 3 to 10 shelves. Of course, ranges both greater and less than those noted above are also contemplated as the disclosure is not so limited.

In some other embodiments, the produce packing cart may include a processor, controller, and/or computer operatively coupled with the first elevator, the second elevator, and the one or more actuators. The processor may control the one or more actuators that move the containers into adjacent shelves. The processor may also control the actuators that move the elevators between the bottom shelf and top shelf.

Depending on the embodiment, the containers used for storing produce in the disclosed produce harvesters and/or produce packing carts may have an appropriate size and shape for a desired type of produce to be harvested. In some embodiments, the containers may have geometries approximate to a rectangular prism and have a length, width, and height dimension, though other container shapes may also be used. In some embodiments, the containers may have a height in the range of about 10 cm to 20 cm. In some embodiments the containers may have a width in the range of about 30 cm to 40 cm. In some embodiments, the containers may have a length in the range of about 40 cm to 60 cm. In some embodiments, the containers may be able to hold a volume of produce in the range of about 10,000 $cm^3$ to 50,000 $cm^3$. Ranges both greater and less than those noted above for a container are also contemplated as the disclosure is not so limited.

In many traditional produce harvesting systems, the produce harvesting system may pick a product and then may need to place the product in another location. Path planning approaches and algorithms for these traditional produce harvesting systems would necessarily include steps for picking the product, transporting the product to another location, and placing the product in that location prior to picking the next product. These types of systems inherently present a non-continuous picking and/or harvesting process. In contrast to these more typical systems, the disclosed produce harvesting system using a vacuum end effector as described herein may permit a produce harvesting system to continuously harvest produce by eliminating the need to separately move the end effector to place a picked product in a desired location. This permits the disclosed produce harvesting systems to implement a different type of path planning approach for produce harvesting that leverages the vacuum end effector to enable faster harvesting of the produce. Specifically, in some embodiments, a produce harvesting system may analyze information related to the surrounding environment to identify clusters of one or more products to be harvested. The system may then generate one or more paths for movement of the end effector based at least in part on the one or more identified clusters of produce. These paths may extend through one or more pieces of produce such that the end effector may be moved along the identified paths to sequentially harvest the individual products located along these paths. By forming lines containing one or more products for harvesting paths, instead of forming paths to pick an individual product, it is possible to decrease the time taken to pick each product as compared to typical harvesting systems.

In some embodiments, path planning may include grouping all produce into clusters, determining a type for each cluster, splitting clusters into lines, and determining proper harvesting ranges for each line. In some embodiments, the produce to be harvested are formed in substantially vertical lines and the planned paths for movement of the end effected determined by the algorithm may be substantially vertical.

In some embodiments, methods including machine learning algorithms may be implemented to help further improve automated farming solutions. In some embodiments, machine learning algorithms implemented to bolster path planning may help a harvesting system to harvest produce faster. For example, in some embodiments, machine learning algorithms and other algorithms that may be used to help form a path for an end effector include Singular Value Decomposition (SVD), Gaussian Mixture Models (GMM), Density Based Spatial Clustering of Applications with Noise (DBSCAN), and any other well-known or custom algorithms. In some embodiments, three-dimensional data collection techniques may be used to collect three-dimensional data related to the produce and the three-dimensional data may be used to develop paths. In some embodiments, a customized distance based algorithm, may be used to control an end effector configured to harvest produce. In some embodiments, the end effector may harvest produce at least in part using vacuum suction.

The disclosed systems and methods may harvest produce faster than typical automated harvesting technologies and may reduce the need for labor which may provide savings both in terms of time and money. The disclosed methods and systems may also be implemented in enclosed farming environments such as greenhouses, though implementations for use in other suitable environments with less predictable surfaces and climate conditions, such as outdoor farms, are also contemplated. Additionally, the disclosed systems and methods may be used to harvest any appropriate variety of produce. In some embodiments, the produce being harvested may be tomatoes, apples, or any other fruit or vegetable or other harvestable product. In some other embodiments, tomatoes may be snacking tomatoes, cocktail tomatoes, or any other variety of tomato. While any product may be harvested with the disclosed systems and methods, tomatoes may be an especially desirable use case as greenhouse grown tomatoes may be grown year-round in greenhouses and tomatoes may grow on vines in clusters that may benefit from the improved harvesting systems, methods, and algorithms disclosed herein.

As used herein, the terms product, produce, piece of produce, and similar terms may be used interchangeably to refer to an object on a plant that is to be harvested including, but not limited to, fruit, vegetables, and/or other appropriate types of produce to be harvested by a produce harvester as disclosed herein.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a system 100 for harvesting produce according to some embodiments. The produce harvester 100 may include a robotic limb 110, an end effector 200, a produce collector 300, and a packing cart 900. A proximal portion of the robotic limb 110 may be coupled to a frame of the produce harvester 100. The end effector 200 may be removably coupled to a distal end portion of the robotic limb 110. One or more sensors 120 may be coupled to the frame, end effector, or other portion of the produce harvester 100. The one or more sensors 120 may be one or more or a combination of a photosensitive detector, a lidar sensor, and a sonar sensor configured to sense two-dimensional and/or three-dimensional data related to the surrounding environment. Lights may optionally be coupled to the frame and be configured to illuminate the surrounding environment and any produce that may be located proximate to the system. The produce collector 300 may be coupled to the frame in some embodiments. It should be understood that embodiments in which the produce collector is indirectly connected to the frame and/or is located separately from the produce harvester including the robotic limb are also contemplated. In either case, the produce harvester may be controlled at least in part by a controller 330 operatively connected to the robotic limb and/or produce collector. The controller may include one or more processors and associated non-transitory computer readable memory that includes instructions that when executed cause the system to perform any of the disclosed methods.

A produce packing cart 900 may be located proximate to the produce harvester 100. The produce packing cart may be controlled at least in part by a controller 918. The controller may include one or more processors and associated non-transitory computer readable memory that includes instructions that when executed cause the produce packing cart to perform any of the disclosed methods. The other components and operation of the produce packing cart are detailed further below.

In some embodiments, the produce harvester 100 and the produce packing cart 900 may have wheels attached to a frame and/or housing of the corresponding produce harvester or produce packing cart. Depending on the embodiment, the wheels may either be configured to engage with rails 916, a flat surface, and/or any other appropriate type of configuration to facilitate transport of the produce harvester and/or produce packing cart. The produce harvester 100 and the packing cart 900 may move separately or may move together depending on the desired operation of the system.

In some embodiments, the produce collector 300 may have a suction line, not depicted, fluidly coupling an inlet of the produce collector 300 to the end effector 200. In some embodiments, the produce collector may have a vacuum source, not depicted, fluidly coupled to the end effector via the suction line and may apply vacuum pressure to the end effector 200. In some embodiments, during operation, the end effector 200 may be positioned adjacent to one or more products to apply a suction to the one or more products to pick the one or more products. The position and orientation of the end effector 200 relative to the produce to be picked may be controlled in part or in whole by the robotic limb 110. In some embodiments, the produce harvester 100 may include a wireless communication device 340 capable of communicating using any appropriate wireless protocol including, but not limited to, cellular, Bluetooth, wifi, and/or any other appropriate type of wireless communication protocol. For example, the wireless communication device may be configured to communicate over a cellular network and/or a local wifi network.

As elaborated on further below, in some embodiments, a path planning algorithm implemented by the controller 330, or other appropriate system, may create one or more paths for the end effector 200 to follow while harvesting one or more products. The path planning algorithm may use three-dimensional data obtained from the one or more sensors 120 to create the one or more paths for the end effector 200 to move along using the robotic limb 110, or other appropriate movement system supporting the end effector. In some embodiments, the three-dimensional data may include images obtained by one or more photosensitive detectors. In further embodiments, the lights coupled to the frame of the produce harvester 100 may be configured to illuminate the produce to improve the quality of the images obtained by the one or more photosensitive detectors. However, as noted above, other embodiments in which other types of sensors 120 are used are also contemplated.

In some embodiments, one or more products picked by the end effector 200 may travel through the suction line from the end effector 200 to the inlet of the produce collector 300. The one or more products entering the inlet of the produce collector 300 may be collected in an internal volume of the produce collector prior to being dispensed into a container that may be supported on a moveable platform 1102 operatively coupled to the frame of the produce harvester 100. As elaborated on further below, the platform may move between a first retracted configuration where produce may be emptied from the produce collector 300 to a second extended configuration where the platform, and any container positioned thereon, may interface with the produce packing cart 900.

The packing cart 900 may include a first elevator 902 which may engage the container disposed on the platform. In some embodiments, the first elevator may move adjacent to a shelf among a plurality of shelves 922 disposed on the packing cart 900 and may move the container from the first elevator into the adjacent shelf. In some embodiments, moving the container from the first elevator into the adjacent shelf may move another container disposed on the adjacent shelf onto a second elevator 904 positioned on an opposing side of the same shelf. In instances in which a container is moved from the second shelf onto an adjacent shelf, the container may displace containers disposed in the adjacent shelf onto the first elevator. The specific control of the different elevators, shelves, and platform to control the movement of filled and empty containers into and out of the produce packing cart is detailed further below.

In some embodiments, the produce harvester 100 may harvest about 30 to 180 products per minute. For example, in some embodiments, the produce harvester 100 may harvest about 60 to 100 products per minute. Of course, ranges both greater and less than those noted above are also contemplated as the disclosure is not so limited.

Figure 2A:
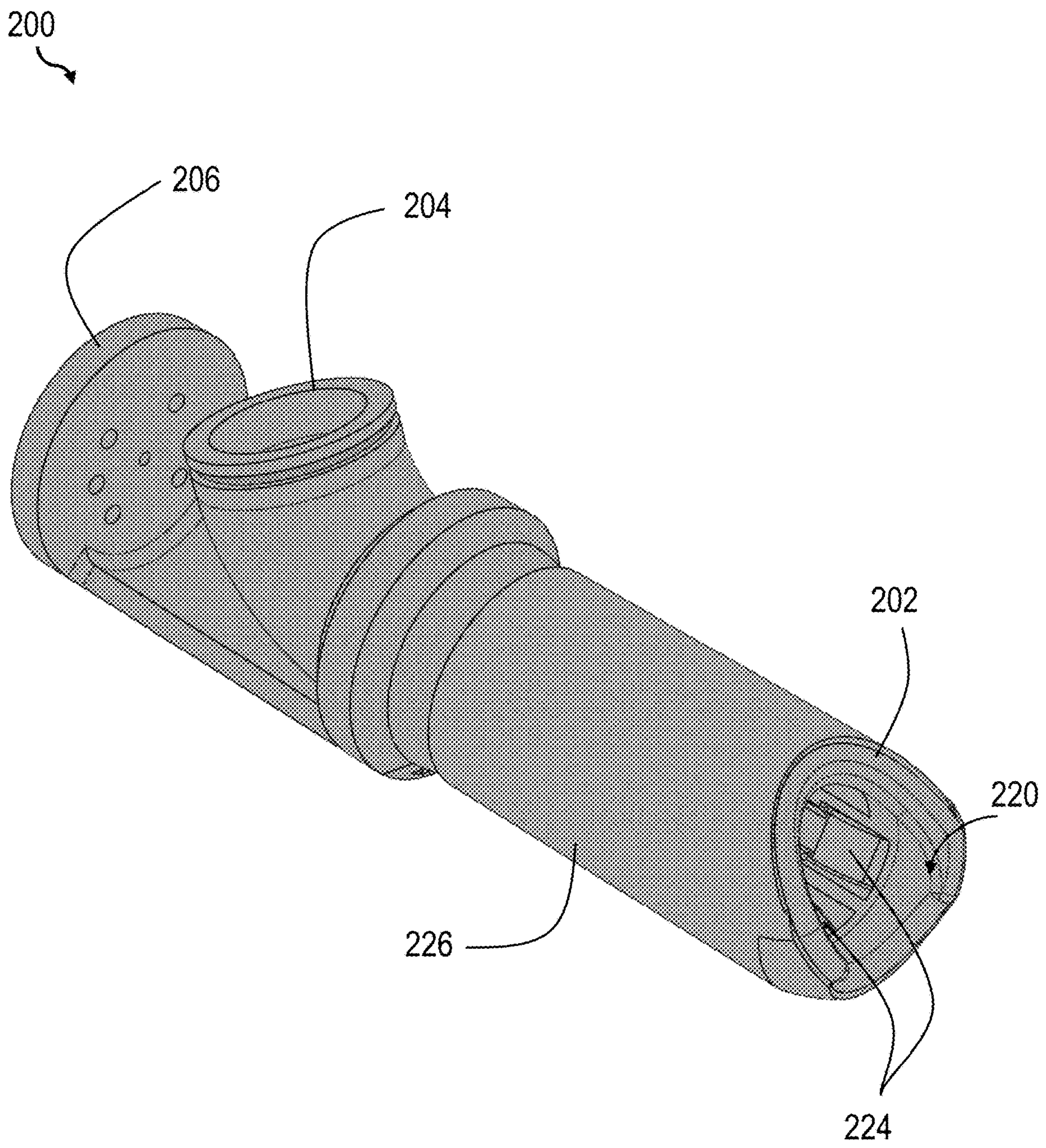
FIG. 2A is a perspective view of one embodiment of an end effector.
Figure 2B:
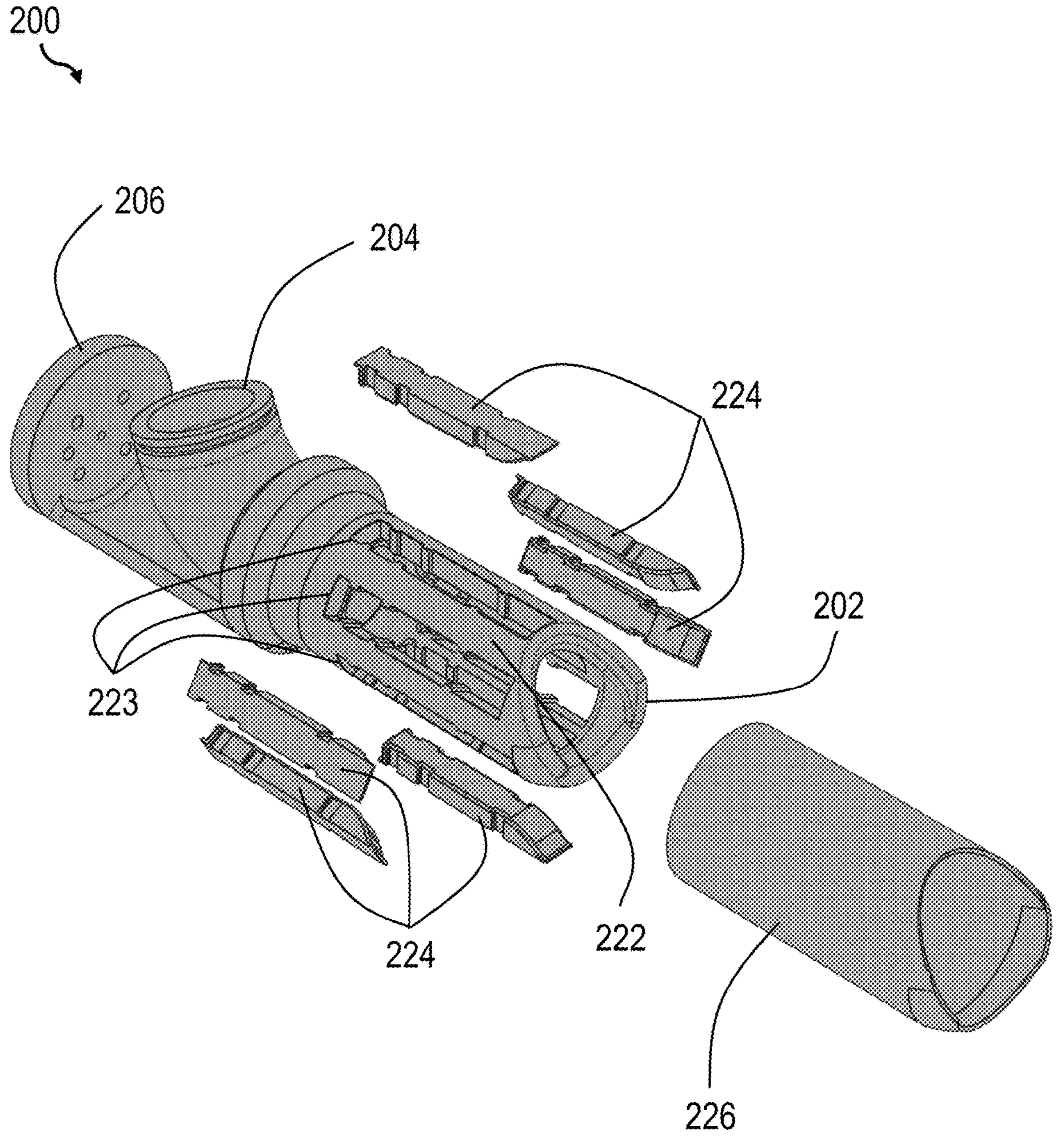
FIG. 2B is a perspective view of an exploded view of one embodiment of an end effector.
Figure 2C:
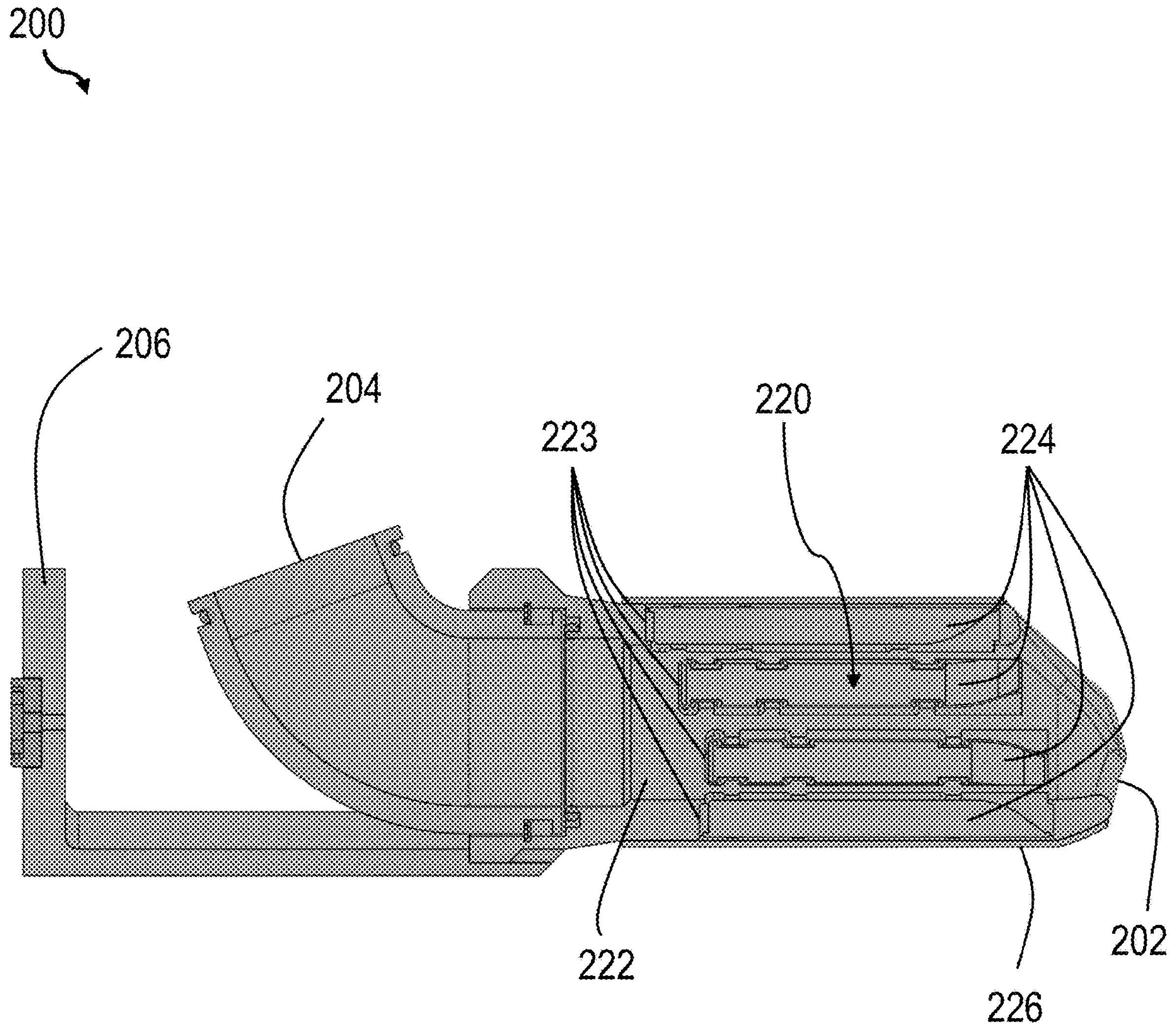
FIG. 2C is a side view of a cross-sectional view of one embodiment of an end effector.

FIGS. 2A-2C show several views of one embodiment of an end effector 200. In the depicted embodiment, the device may include a bracket 206, or other appropriate type of connection, that is configured to couple the end effector 200 to a robotic limb. The end effector 200 may also include an opening 202 on a distal portion of the end effector that is coupled to a vacuum port 204 via a channel 220 extending there between. The opening 202 may include one or more surfaces that are angled relative to a longitudinal axis of the distal end portion of the end effector 200. For example, the depicted end effector includes a first larger angled surface and a second smaller angled surface. Such an angled opening may facilitate harvesting of a product while reducing undesired contact and force application to a sequentially located product disposed along a desired path of travel of the end effector. The one or more angled surfaces of the opening 202 may be angled relative to a longitudinal axis of the distal end portion of the end effector by any appropriate angle, including, for example, an angle that is between or equal to 30 degrees to 75 degrees.

In addition to the above, in some embodiments, one or more interior surfaces of the end effector 200 may be smooth. For example, one or more interior surfaces of the opening 202, vacuum port 204, tube 222, cavities 223, detents 224, sleeve 226, any other appropriate portion of the end effector 200 through which a piece of produce may pass, or any combination thereof may be smooth. Additionally, a conduit, such as a pipe and/or tube, may couple the end effector 200 to any other appropriate portion of the produce harvester 100 (e.g., a produce collector 300). This conduit may also be smooth in some embodiments. Smooth interior surfaces may help to avoid potential damage to produce traveling through the end effector 200 that could occur if the interior surface is not smooth (e.g., corrugated). Optionally, the conduit connected to the end effector 200 (e.g., coupled to the vacuum port 204) may also be flexible although the disclosure is not limited to flexible tubing as stiff conduits are also contemplated. Additionally, in some embodiments, a distal end portion of the conduit connected to the end effector may include a longitudinal axis that is aligned with an axis passing through an opening of the end effector such that produce entering the end effector and into the conduit may travel along a substantially linear path. Of course, embodiments in which the end effector and/or distal end portion of the conduit are angled relative to each other are also contemplated.

The vacuum port 204 may be configured to be fluidly coupled to a vacuum source. The end effector 200 may be configured to include an axially aligned suction line with the opening 202. In some embodiments, a proximal portion of the channel portion 220 of the end effector 200 may be axially aligned with a path of travel of produce through the vacuum port 204. Such alignment may allow for produce to be harvested more gently by accelerating the produce in a single direction along a longitudinal axis of the end effector and an adjacent portion of the coupled vacuum line, not depicted. Accelerating produce in a single direction may reduce the complexity of the produce harvester 100 and reduce cost and harvesting time.

As noted above, the end effector may include at least a portion of the channel adjacent to the opening 202 that has a variable area. Accordingly, in some embodiments, the channel 220 may include one or more movable detents 224 that extend at least partially into the channel 220. In the depicted embodiment, the detents are moveably retained in a desired configuration relative to a tube 222 such that the detents may move from a retracted configuration to an extended configuration. During operation, the detents 224 may be biased to the extended position via the applied vacuum pressure which may suck the detents into the interior of the channel.

During use, as the produce being harvested enters the channel 220 and either contacts or otherwise approaches the one or more detents 224 in the extended configuration, the one or more detents 224 may at least partially move to the retracted configuration to accommodate the product. The one or more detents 224 moving at least partially toward the retracted configuration may temporarily increase the area of the portion of the channel 220 that the product is in. In some embodiments, a flow of air may be disposed between the product and the one or more detents 224. However, instances in which there is contact between a product and the detents 224 are also contemplated. Once the produce being harvested travels through the channel 220 extending past the one or more detents 224, the detents 224 may return to the extended configuration.

Depending on the embodiment, the detents 224 may be coupled to the tube 222, or other portion of the end effector, via any appropriate connection. The tube 222 may include one or more cavities 223 formed therein that are sized and shaped to accept the detents 224. In the retracted configuration, the detents 224 may be contained at least partially within the cavities 223 and extend into the inner diameter of the tube 222 to a lesser extent than in the extended configuration. In the shown embodiment, the detents 224 may be captured and freely move within the cavities 223 due to one or more retaining features configured to retain the detent 224 at least partially within the cavity 223 such as a protruding edge, ledge, any other protruding feature, or any other mechanically interlocking feature. In some embodiments, the protruding feature within the cavity 223 may be proximate to the inner surface of the tube 222 and may contact a portion of a detent 224 when the detent 224 is in the extended configuration. In some embodiments, the protruding feature of the cavity 223 may contact the detent 224 on a surface of an overhanging feature of the detent 224 such as a lip. In some embodiments, the detents 224 may include overhanging features on one or mode surfaces of the detent. To help retain the detents in the cavities, the end effector may include a sleeve 226 disposed on an outer surface of the tube 222 at a location that at least partially overlaps with the detents to prevent radially outward motion of the detents 222 beyond a desired maximum retracted position. In instances where the sleeve extends to a distal end portion of the end effector, the sleeve may include one or more angled surfaces that match the angled surfaces of the end effector opening 202.

Produce to be harvested may require the end effector 200 to be movable with one or more degrees of freedom. Thus, the end effector 200 may be removably, or permanently, coupled to a robotic limb 110 with one or more degrees of freedom that may enable the end effector 200 to move with one or more degrees of freedom. The end effector 200 may be coupled to the robotic limb 110 via a bracket 206 or any other appropriate connection as previously described.

Produce traveling through a suction line with relatively large changes in direction may present a potential to damage the produce. For example, produce traveling through a suction line with a relatively large change in direction (i.e., large angle bend) may contact and/or impact an interior surface of the suction line potentially damaging the produce. Accordingly, in some embodiments, an end effector 200 may include a vacuum port 204 that is configured to provide inline suction where a vacuum line may be attached to and aligned with a proximal portion of the channel 220 associated with the vacuum port 204 and the vacuum port 204 and suction line may exhibit turns and bends that are less than a desired threshold angle. This threshold angle may be less than or equal to 60 degrees, 45 degrees, or any other appropriate angle for a desired type of produce. To help facilitate the use of inline vacuum lines, in some embodiments, the end effector 200 may be coupled to the robotic limb 110 such that the end effector 200 is offset from a longitudinal axis of a distal end portion of the robotic limb 110. Offsetting the end effector 200 may also enable rotating the end effector 200 to an appropriate roll orientation as described in the proceeding descriptions regarding path planning.

Figure 3A:
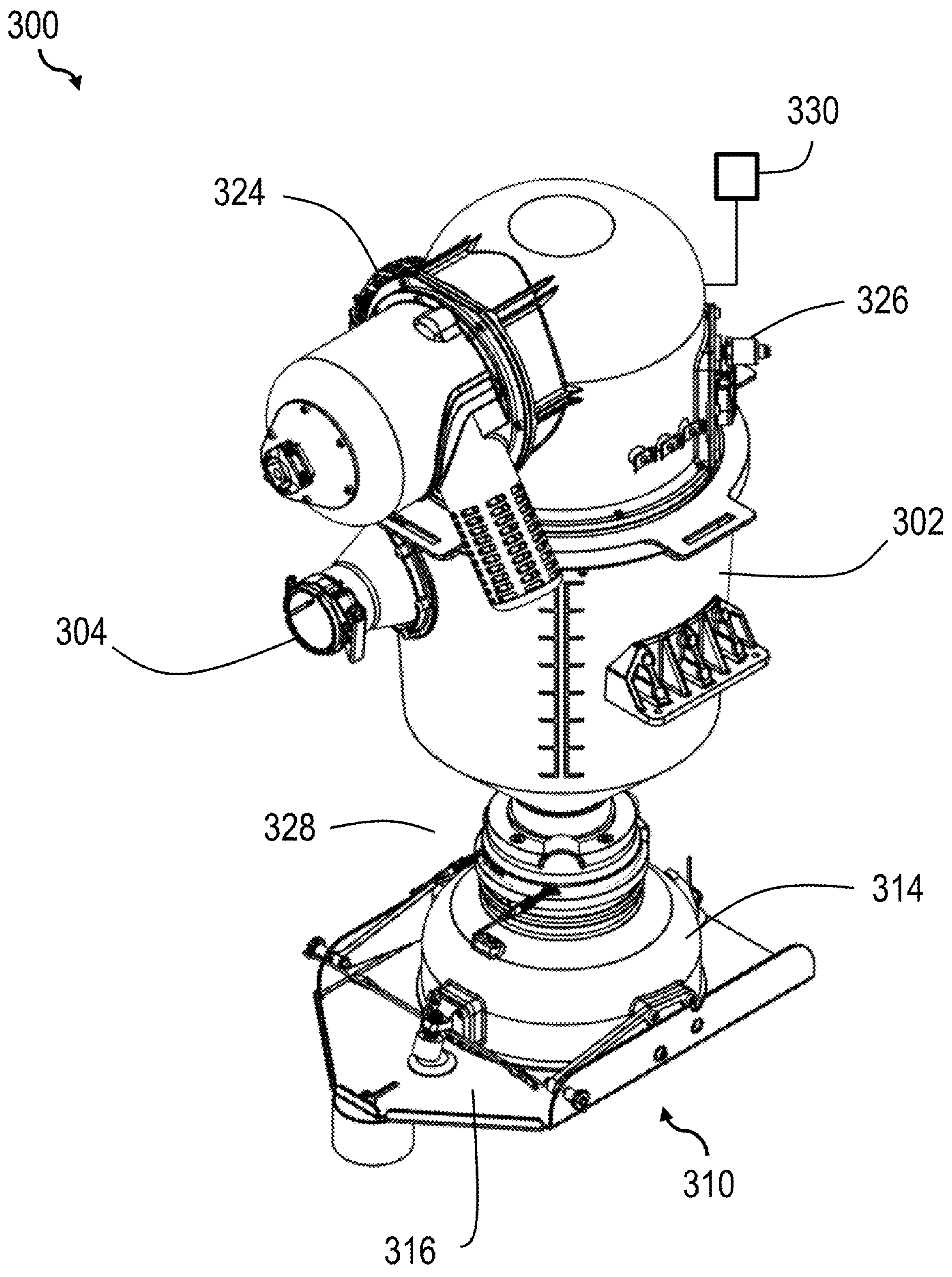
FIG. 3A is a perspective view of one embodiment of a produce collector.
Figure 3B:
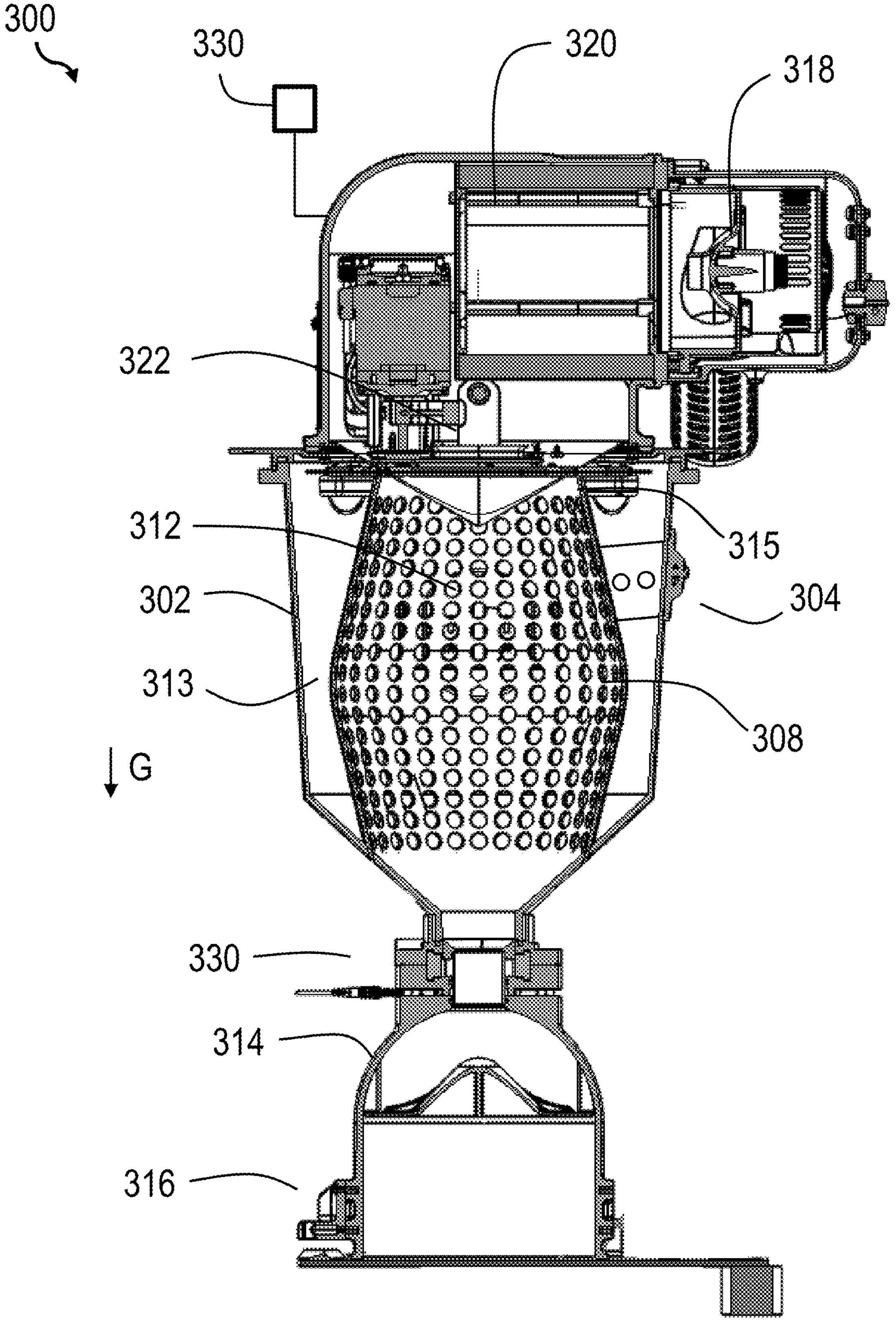
FIG. 3B is a side cross-sectional view of one embodiment of a produce collector.
Figure 3C:
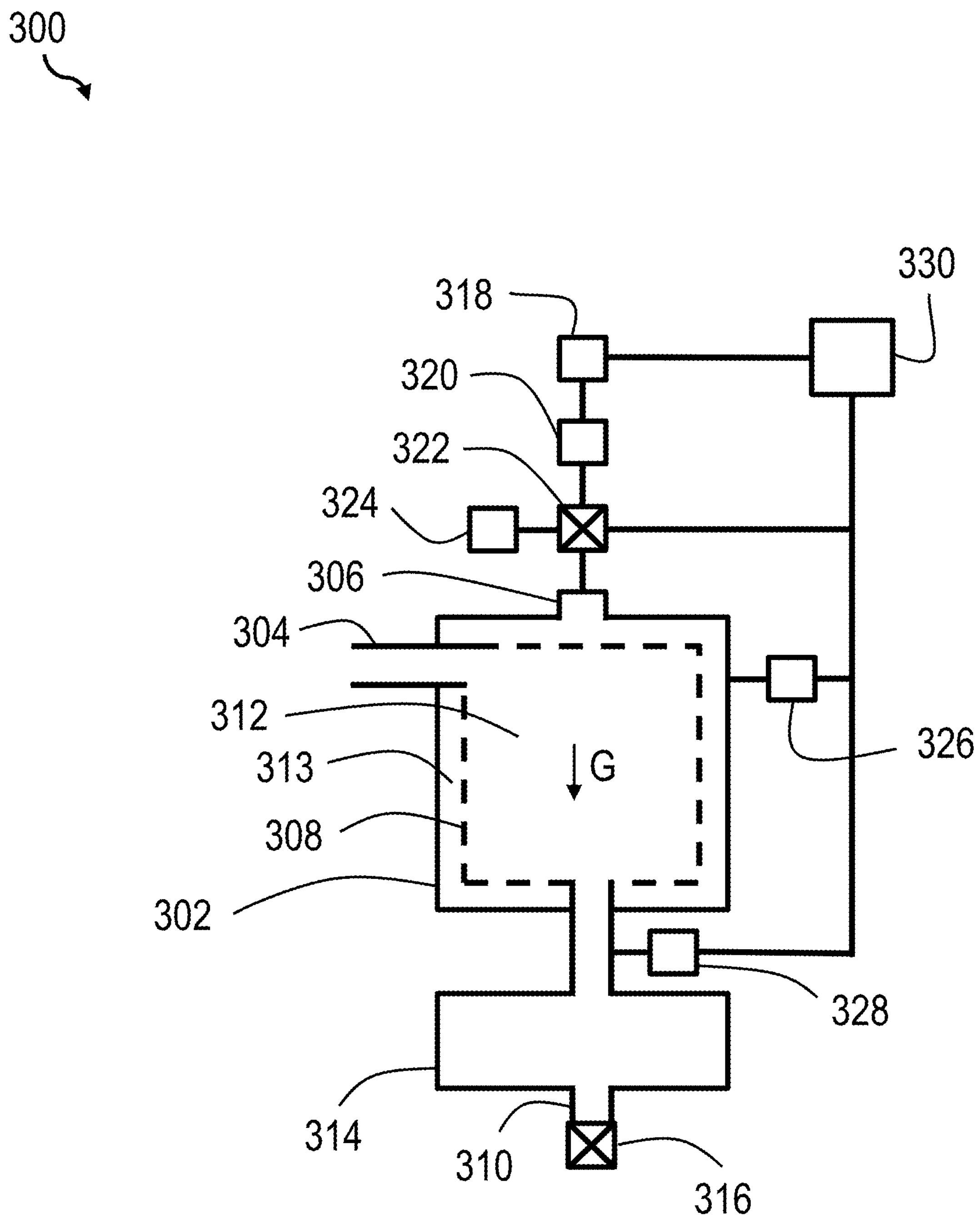
FIG. 3C is a schematic view of one embodiment of a produce collector.

FIG. 3A-3C show several views of one embodiment of a produce collector 300. The produce collector 300 includes a housing 302 having an interior volume 312. A produce inlet 304 may be formed in the housing 302 such that it is coupled to the interior volume 312. A vacuum port 306 is fluidly coupled to the interior volume 312. A flexible sheet 308 is disposed in the interior volume 312 and is separated from at least a portion of the interior surface of the housing 302 by a gap 313. In this embodiment, the gap 313 is present between substantially vertical side surfaces of the interior volume 312 such that the flexible sheet 308 may move in a horizontal direction within the interior volume 312. An upper portion of the flexible sheet 308 may be coupled to an upper portion 315 of the interior volume 312 of the housing 302. The interior volume 312 may also include a bottom portion 314 that may include an outlet 310. A dump gate 316 may be associated with the outlet 310 to selectively retain harvested produce in the bottom portion 314 of the interior volume 312. A vacuum source 318 may be fluidly coupled to the vacuum port 306. The vacuum source 318 may be a pump, a connection to a central vacuum system, and/or any other appropriate vacuum source. In some embodiments, a vent port 324 is fluidly coupled to the vacuum port 306, the vacuum source 318, the interior volume 312, and/or other appropriate portion of the produce collector 300. A valve 322 may be fluidly coupled to the vacuum port 306, the vacuum source 318, and the vent port 324 to control the application of vacuum pressure to the interior volume 312 of the produce collector 300.

In some embodiments, a cross section of a portion, and in some instances an entire, interior volume 312 of the housing 302 may be circular. For example, a cross section of the interior volume proximate to a location where the produce enters the interior volume may be circular. Of course, any other portion of the produce collector 300 may include a circular cross section, including the bottom portion 314, the flexible sheet 308, any other appropriate portion of the produce collector. Without wishing to be bound by theory, forming the interior volume 312 in a circular geometry may allow air to flow within the produce collector 300 such that the vacuum pressure experienced by the end effector 200 is higher relative to other potential geometries of the interior volume (e.g., square). Additionally, forming the interior volume 312 and any other appropriate portion of the produce collector 300 (e.g., flexible sheet 308) with a circular, or at least curved, geometry may encourage produce entering the interior volume to travel downward with respect to a local direction of gravity G in a spiraling pattern. The spiraling pattern may serve to reduce the potential for damage of the produce by reducing the transfer of kinetic energy between the produce and the flexible sheet 308 and/or other portions of the produce collector 300. Of course, the housing 302 and any other portion of the tomato chamber 300 may have any appropriate shape as the disclosure is not so limited.

As noted above, the flexible sheet 308 may be fixed to an upper portion 315, or other appropriate portion, of the interior volume 312. A bottom portion of flexible sheet 308 may be unattached to the interior volume 312 such that the bottom portion of the flexible sheet 308 may move within the interior volume 312 freely. The flexible sheet 308 may extend at least partially around a cross-sectional perimeter of the interior volume 312 and at least partially along a length of the interior volume 312. For example, the flexible sheet 308 may extend around a portion of the inner perimeter of the interior volume 312 opposite from the produce inlet 304. Accordingly, the flexible sheet 308 may be configured such that produce entering the interior volume 312 of the housing 302 through the produce inlet 304 may be captured in the flexible sheet 308 prior to falling into a bottom portion 314 of the interior volume 312 relative to a direction of gravity G. Deformation of the flexible sheet 308 within the gap 313 may decelerate a product entering the interior volume 312 of the produce collector 300 which may reduce, or eliminate, the occurrence of damage to the produce. In some instances, an orientation of the product inlet 304 relative to the flexible sheet 308 may cause a product entering the interior volume 312 to impact the flexible sheet 308 and remain in contact with the flexible sheet 308 until entering a bottom portion 314 of the interior volume 314 of the produce collector 300. For example, the product may move downwards in the interior volume 312 in a spiraling pattern while contacting the flexible sheet 308.

The flexible sheet 308 may be configured to permit air to flow through the flexible sheet 308. The air may flow through the flexible sheet 308 to enable the flexible sheet 308 to remain inside the interior volume 312 and maintain a relatively constant position in the interior volume 312 without obstructing air flow within and through the interior volume 312. To facilitate this, the flexible sheet 308 may include a plurality of holes or pores that may help avoid the occlusion of air flow through the flexible sheet 308.

In some embodiments, the flexible sheet 308 may be made of a food grade material appropriate for handling consumable produce. The flexible sheet 308 may be made from a sufficiently elastic material to enable elastic deformations of the flexible sheet 308 during use. In some embodiments, the flexible sheet 308 may be made of silicone, nylon, any other relatively flexible polymer, or any other relatively flexible and/or soft material. In some embodiments, the flexible sheet 308 may be a net, a film with holes and/or pores, a membrane, or any other flexible structure.

In some embodiments, a counter 328 may be positioned within an appropriate portion of the interior volume 312 disposed between the produce inlet 304 and the bottom portion 314 of the interior volume where the produce is collected. The counter may also optionally be coupled to the produce inlet 304, coupled upstream to the produce inlet 304, or coupled to any appropriate portion of the produce collector 300 where the counter may count produce as it enters, travels through, or exits the produce collector. The counter 328 may be coupled to a controller 330 such that signals may be transmitted to the controller. The counter 328 may count the produce as it moves between the produce inlet 304 and the bottom portion 314 of the interior volume 312. The information from the counter 328 may be used to collect information or control at least a portion of the produce collector 300 and/or the produce harvester 100.

The produce collector 300 may include a gate 316 coupled to the outlet 310 of the interior volume 312. The gate 316 may be configured to open when a weight of the produce contained in the interior volume 312 is greater than a threshold weight. In some embodiments, the gate 316 may open when the weight of the produce contained within the interior volume 312 is greater than a threshold weight. The gate 316 may be opened automatically using a load sensor and electronically activated lock (mechanical or magnetic), motor, or other appropriate type of actuation in response to a signal from a load sensor being greater than the threshold weight. In some embodiments, the load sensor may be a load cell, a torque sensor associated with the gate, or any other appropriate type of load sensor. As an alternative to the use of a load sensor, in some embodiments, information from the counter 328 may be used to determine if a threshold value of produce is stored in the bottom portion 314 prior to opening the gate 316. In yet another embodiment, the gate 316 may include a lock that is biased to a locked position by a biasing member such as a spring, and when a threshold weight of produce is contained in the interior volume 312 the biasing force of the biasing member is overcome, opening the latch, and permitting the gate to open. In the various embodiments described above, the gate 316 may be biased towards a closed position by a spring or other elastic structure and/or an actuator may be used to move the gate 316 between the open and closed positions.

In some embodiments, the vacuum source 318 may be selectively fluidly coupled to the environment via the vent port 324 by activating the valve 322. In a first configuration, the valve 322 may fluidly couple the vacuum source 318 to the vacuum port 306. In a second configuration, the valve 322 may fluidly couple the vent port 324 to vacuum source 318 and decouple the vacuum port 306 from both the vent port 324 and vacuum source 318. In the first configuration, the pressure of the interior volume 312 is determined primarily by the vacuum source 318. In the second configuration, the pressure of the interior volume 312 is determined by the pressure of the environment as air may flow from the environment to the interior volume 312 to reduce the vacuum applied to the interior volume 312 of the produce collector 300. Such an arrangement may allow for relatively fast selective changes to the pressure of the interior volume 312 to permit vacuum pressure to be selectively applied to an associated end effector during a harvesting operation. The arrangement may also help to minimize vacuum pressure experienced by the end effector, which may avoid undesired suction of vines, peduncles, branches, and/or produce.

In some embodiments, a filter 320 may be disposed along a flow path extending between the vacuum port 306 and the vacuum source 318 as well as between the interior volume 312 and the vacuum source 318. The filter 320 may filter incoming air to the vacuum source 318. Filtering air may prevent unwanted dust, particulates, debris, and/or other contamination from entering the vacuum source 318. Any appropriate type of filter that permits the desired flow rate of air through the system may be used.

In further embodiments, a pressure sensor 326 may be fluidly coupled to the interior volume 312 and/or the bottom portion 314 of the interior volume. The pressure sensor 326 may be coupled to a controller 330. The pressure sensor 326 may detect the pressure of the interior volume 312 and/or the bottom portion 314 of the interior volume. The information from the pressure sensor 326 may be used to collect information or control at least a portion of the operation of the produce collector 300 and/or the produce harvester 100. For example, the information collected by the pressure sensor may be used to control elements of the harvesting system, including the dump gate, vacuum source, valve, and other components.

Figure 4A:
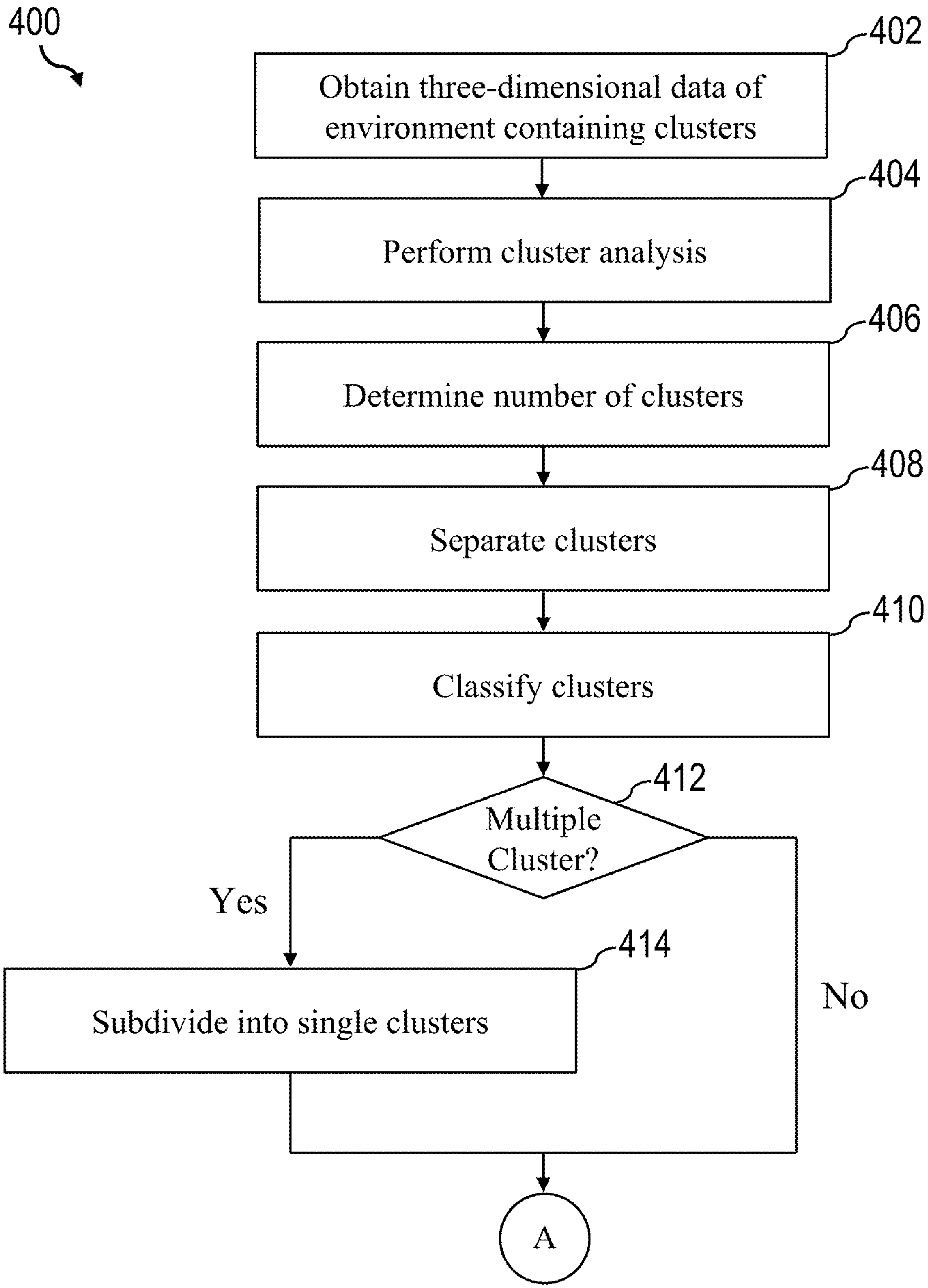
FIG. 4A-4B is a flow chart for one embodiment of a method of controlling a produce harvesting system.
Figure 4B:
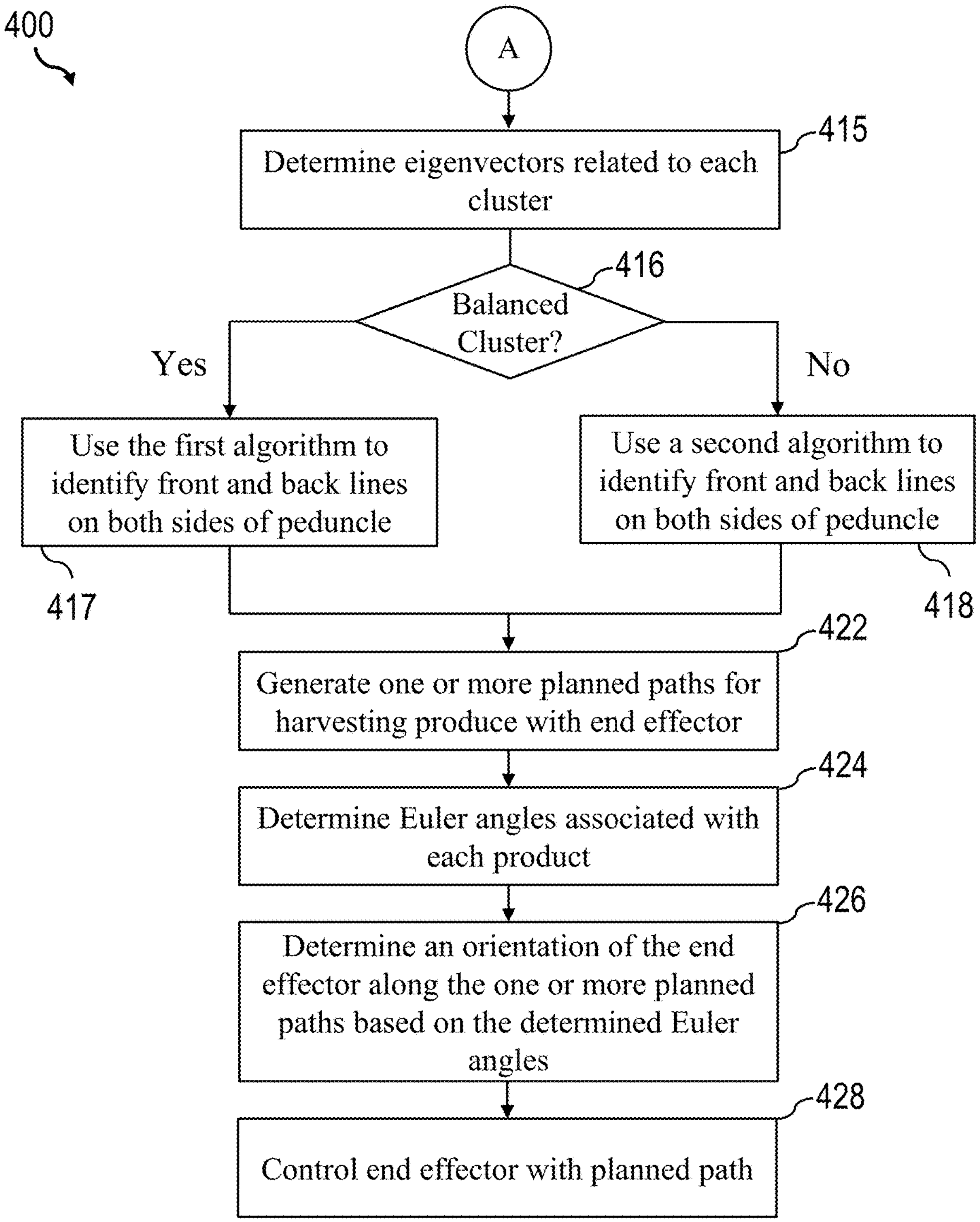

FIG. 4A-4B is a flow chart for one embodiment of a method 400 for controlling operation of a produce harvesting system 100. The use of a vacuum based end effector 200 may permit the use of path planning directed to harvesting groups of produce located along one or more paths, which in some instances may extend at least partially in a vertical direction. Following a continuous path for harvesting may decrease the time taken to pick each product. As detailed further below, forming the paths for movement of the end effector 200 may be accomplished by clustering the produce to be harvested into corresponding clusters, determining a type for each cluster, splitting clusters into lines, and determining appropriate harvesting orientation ranges for produce located along each path.

A first step 402 of the method 400 may include obtaining three-dimensional data related to produce that will be picked. Obtaining the three-dimensional data may include obtaining three-dimensional data from at least one selected from a group of a photosensitive detector, a lidar sensor, and a sonar sensor. For example, in some embodiments, the three-dimensional data may be obtained at least in part by an RGB photosensitive detector and/or a stereo photosensitive detector. In some embodiments, the stereo photosensitive detector may be used to determine the depth of the produce relative to a robot coordinate frame. In some embodiments, the three-dimensional data from the RGB photosensitive detector may also be used to determine the color of the one or more products. In another example, the three-dimensional data may be obtained at least in part by a time of flight (TOF)

sensor. In a further example, the three-dimensional data may be obtained at least in part by a hyperspectral camera. The determined color of the one or more products may then optionally be used to determine the ripeness of the one or more products to determine which produce in the surrounding environment should be harvested. In some embodiments, the produce may be illuminated by one or more lights on the produce harvester at least partly to improve the color detection. However, any other method for determining ripeness may be used as the disclosure is not so limited. For example, ripeness may be determined based at least in part on a shape and/or size of a product. In another example, ripeness may be determined based at least in part on the brix content of a product.

After obtaining three-dimensional data for produce to be harvested, a cluster analysis using the three-dimensional data may be performed in order to identify one or more clusters of produce in the surrounding environment, sec 404. Any appropriate type of clustering function capable of grouping the different clusters of produce into separate clusters for harvesting may be used. For example, appropriate clustering algorithms may include, but are not limited to, density-based spatial clustering of applications with noise (DBSCAN), Gaussian mixture model (GMM), k-means clustering algorithm, balance iterative reducing and clustering using hierarchies (BIRCH), affinity propagation clustering algorithm, mean-shift clustering algorithm, ordering points to identify the clustering structure (OPTICS), agglomerative hierarchy clustering algorithm, region growing segmentation, trained convolutional neural networks, trained transformer networks, combinations of the forgoing, and/or other appropriate clustering algorithms.

In some embodiments, the method 400 may include identifying the separate clusters based on an output from the clustering algorithm, see 408. The individual clusters may then be classified to the type of cluster to help determine what type of harvesting strategy is appropriate for harvesting a particular cluster, see 410. This classification may include determining if a particular cluster is a single cluster, a multiple cluster, an angled cluster, a non-angled cluster, a balanced cluster, an unbalanced cluster, a ripe cluster, an unripe cluster, and any other feature of the cluster and/or produce. In some embodiments, the clusters may be classified at least in part to improve line denotation and approach angle calculation. The above cluster classifications are detailed further below in regards to FIGS. 5A-5E.

In instances where an identified cluster is a multiple cluster including multiple sub-groups of produce (e.g., separate clusters of produce attached to separate parallel portions of a peduncle), these multiple clusters may be subdivided into single clusters, see 412 and 414. The separation of multiple clusters into single clusters may be performed via a combination of classical and machine learning based approaches. A classical approach involves using predefined cluster heuristics to define certain cluster dimensionality. For example, if it is known that a single cluster should have a maximum of width, but the cluster is determined to have a width that is larger than the predetermined maximum width, an algorithm may be used to recursively recluster the multiple cluster into multiple separate clusters. A machine learning based model may also be trained to perform such a task with high accuracy. Such models can make use of architectures such as convolutional neural networks or transformers but are not limited to such architectures.

After clustering the produce appropriately, the method 400 may determine one or more eigenvectors related to each cluster at 415, appropriate methods for determining the eigenvectors are described further below. The method 400 may determine if a cluster is a balanced cluster or an unbalanced cluster at 416. To determine whether a cluster is balanced, information from eigenvectors and their distance relative to products determined to be appropriately ripe may be used. The length of the major eigenvector may be extended to allow measurement of the Euclidean distance from the extended eigenvector and all products determined to be ripe. If the Euclidean distance between the extended major eigenvector and a ripe product is within a distance threshold, then the cluster is determined to be unbalanced. The distance threshold may be set at any appropriate value as the disclosure is not so limited. In further embodiments, statistical models may be trained to detect and classify known balanced and unbalanced clusters. Such models can include architectures such as convolutional neural networks or transformers but are not limited to such architectures. In further approaches, other distance associated algorithms may be performed on the cluster and the count (i.e., quantity) of produce in each generated line may be compared. Depending on if the cluster is balanced or not, either a first algorithm or a second algorithm may be used to identify the front and back lines of a cluster on both sides of the peduncle.

In some instances, a first algorithm may be used to identify front and back lines related to the one or more clusters of produce, see 417. The first algorithm may optionally be used if the cluster is classified as a balanced cluster. In some embodiments, the eigenvectors may be obtained at 415 at least in part through a cluster analysis on three-dimensional data related to a cluster of produce. In further embodiments, the eigenvectors may be obtained at least in part through singular value decomposition (SVD) and/or Support Vector Machine (SVM) on the three-dimensional data related to the cluster of produce. In some embodiments, the first algorithm may use SVD at least in part to determine the one or more eigenvectors related to the one or more clusters of produce. SVD may be a process of factorization of a real or complex matrix. In some embodiments the real or complex matrix may be two-dimensional and/or three-dimensional data collected related to the produce. In further embodiments, SVD may be used to generate the eigenvectors associated with the cluster. In some embodiments, SVD may work well on clusters containing an even number of products. In further embodiments SVD may be used at least in part to generate the one or more paths for the end effector 200 to follow during harvesting for clusters of produce identified as balanced. In even further embodiments, any other machine learning algorithm may be used at least in part to generate the one or more paths for the end effector 200 to follow during harvesting of produce. In some other embodiments, the first algorithm may use any other matrix factorization or matrix decomposition technique including polar decomposition at least in part to determine the one or more eigenvectors related to the one or more clusters of produce. The one or more paths for movement of the end effector 200 may optionally be generated based at least in part on the one or more eigenvectors. In some embodiments, the method 400 may include determining a major eigenvector based on the one or more eigenvectors. In some embodiments, the major eigenvector may be the eigenvector associated with the highest quantity of produce, correlating to the location and direction of the peduncle.

Using the first algorithm, the front and back lines may be identified based at least in part on the identified middle or major eigenvector. For example, the location of a peduncle of a cluster may approximately follow the determined major eigenvector. The front line may be formed among sequentially located produce on a first side of the major eigenvector and the back line may be formed among sequentially located produce on a second side of the major eigenvector as determined by the middle eigenvector. In some embodiments, the front line may be the line closest to the produce harvester and/or end effector and the back line may be the line located further away from the produce harvester and/or end effector.

In some embodiments in which SVD is used, three matrices may be produced. One of the matrices contains the three Eigenvectors which may have the same length of 1 and which point in three different directions. The origin of the Eigenvectors may be the center of the cluster. This may correspond to the mean of the produce in that cluster. The second matrix may contain the eigenvalues or scale. This second matrix may be used to determine which one of the corresponding eigenvectors is the major, middle and minor eigenvector where the eigenvector with the largest corresponding eigenvalue is the major eigenvector. The third and last matrix may contain the coordinates of all the produce in that cluster as it relates to the origin of the cluster. This matrix may be used to determine if a product is to the left or right of a cluster. For example, looking at produce coordinates that correspond with the middle eigenvalue it may be possible to identify all positive values as being on one side of the cluster and all negative values as being on a different side of the cluster.

In some embodiments, the second algorithm may be used to identify front and back lines related to the one or more clusters of produce at 418. The second algorithm may optionally be used if the cluster is classified as an unbalanced cluster. The second algorithm may be referred to as a distance associated algorithm. The distance associated algorithm may be used at least in part to generate one or more paths for the end effector 200 to follow during harvesting of produce for clusters of produce identified as unbalanced. In some embodiments, the distance associated algorithm may be used at least in part to determine the front line 510 and the back line 520 associated with the cluster produce. In some embodiments the distance associated algorithm may consider a topmost product relative to a direction of gravity and then use a trained set of parameters, weights, and constraints to determine a next product in a line. In some embodiments, the next product in a line may be the product most proximate to the topmost product in a downward direction. The parameters may optionally be weighted. In some embodiments, the parameters and/or weighted parameters used by the distance associated algorithm may include one or more of Euclidean distance associated with the one or more products, distances along one or more directions associated with the centroid of the one or more products, any other distance associated with the one or more products, and one or more angles associated with the one or more products. In further embodiments, the one or more of Euclidean distance associated with the one or more products, distances along one or more directions associated with the centroid of the one or more products, any other distance associated with the one or more products, and one or more angles associated with the one or more products may have associated fixed thresholds. After the next product in the line is determined, another next product in the line may be determined. Products may be sequentially added to a line until every product associated with one side of the cluster is added to the line.

In some embodiments, if an identified cluster is classified as a double cluster 550, the path planning algorithm may attempt to separate the double cluster 550 into two or more single clusters. In further embodiments, separating the double cluster 550 into two or more single clusters may be performed as a preliminary step, thereby occurring prior to the first algorithm, second algorithm, or any other algorithm. In even further embodiments, separating the double cluster into one or more single clusters may be performed after first algorithm, the second algorithm, or any other algorithm. In some embodiments, a front line and a back line may be generated on a single cluster. In further embodiments, the front line may be the closest of the generated lines to the produce harvester 100 in a direction. In even further embodiments, the back line may be the furthest of the generated lines to the produce harvester 100 relative to a location of the end effector. For example, in some embodiments, a front line may be considered to connect the produce on a first side of a major eigenvector. In some embodiments, the first and second algorithms may be used independently of one another or may be used in parallel. For example, both steps 417 and 418 may be performed (i.e., used in parallel) regardless of whether a cluster is determined to be balanced or unbalanced at 416.

In some embodiments, the second algorithm may be used at least in part to determine the front line 510 and the back line 520 associated with the cluster of produce. In some embodiments the second algorithm may consider a topmost product relative to a direction of gravity and then use a trained set of parameters and weights to determine a next product in a line. In some embodiments, the next product in a line may be the product most proximate to the topmost product in a downward direction. In some embodiments, the parameters may be weighted. In some embodiments, the parameters and/or weighted parameters used by the second algorithm may include one or more of Euclidean distance associated with the one or more products, distances along one or more directions associated with the centroid of the one or more products, any other distance associated with the one or more products, and one or more angles associated with the one or more products. In further embodiments, the one or more of Euclidean distance associated with the one or more products, distances along one or more directions associated with the centroid of the one or more products, any other distance associated with the one or more products, and one or more angles associated with the one or more products may have associated fixed thresholds. After the next product in the line is determined, another next product in the line may be determined. Products may be sequentially added to a line until the stopping constraints for the algorithm are met, denoting the completion of one line. For example, the stopping constraint may include adding a certain number or each product associated with one side of a cluster to a line. In other embodiments, any other algorithm may be used to determine the one or more eigenvectors related to the one or more products and/or one or more clusters. In some embodiments, the second algorithm may use the middle and minimum eigenvectors obtained using the first algorithm at least in part to determine which generated lines are the first line or the second line.

After identifying a front line passing through one or more pieces of produce associated with a first side of a peduncle the produce is attached to and a back line passing through one or more pieces of produce located on a second side of the peduncle, it may be desirable to generate one or more planned paths for harvesting produce with the end effector. In some embodiments, the method 400 may include generating one or more planned paths for harvesting and/or picking produce with the end effector at 422. These planned paths may correspond to a linear path, a non-linear path, or any other appropriate path that extends through one or more pieces of produce. For example, the path may be planned by extending a path such that it extends through the one or more sequentially located pieces of produce disposed on a desired side of a peduncle and/or the major eigenvector of a particular cluster. In instances when produce is located on opposing sides of the peduncle, the planned paths may extend on opposing sides of the peduncle. However, embodiments in which the two or more planned paths extend on a single side of a peduncle are also contemplated.

In some embodiments, the method 400 may be desirable to determine an appropriate orientation of an end effector along a planned path for appropriate harvesting of the produce. This may both improve the harvesting of individual pieces of produce as well as minimize unintended contact with adjacent pieces of produce. In such an embodiment, one or more Euler angles associated with the one or more products disposed along the one or more planned paths may be determined, see 424. In some embodiments, the method 400 may include determining one or more orientations of the one or more clusters, see 426. The one or more orientations of the one or more clusters may optionally be generated based at least in part on one or more Euler angles associated with the one or more products. The three-dimensional data, which may include image data, may also optionally be analyzed to obtain one or more Euler angles associated with the produce. Formation of the one or more Euler angles is detailed below. The orientation of the end effector along the planned path may optionally be controlled based at least in part on the one or more determined Euler angles. Specific implementations of such control is detailed further below in regards to FIGS. 8A-8C.

After generating the planned paths and associated optional end effector orientation, the method 400 may include controlling movement of the end effector to follow the one or more generated paths, see 428. In some embodiments, the end effector may be controlled to follow the one or more paths in a direction that is oriented at least partially, and in some instances may be substantially, downward relative to a direction of gravity. An associated produce harvester may be operated to harvest the produce as the end effector is moved along the planned paths. For example, a vacuum may be applied to the end effector to apply suction to pick produce located along the one or more paths using the end effector as the end effector is moved along the planed paths.

The above method may be implemented by one or more controllers including at least one processor operatively coupled to the various controllable portions of a produce harvester as disclosed herein. The method may be embodied as computer readable instructions stored on non-transitory computer readable memory associated with the at least one processor such that when executed by the at least one processor the produce harvester may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

FIGS. 5A-5E are exemplary views of different types of clusters that may be harvested by the produce harvesting system. In some embodiments, the path planning algorithm may classify each identified cluster 500 into one or more types of produce arrangements to generate and/or improve the one or more harvesting lines and one or more approach angle ranges. As noted above, in some embodiments, a cluster analysis may be performed on three-dimensional data to identify and classify one or more clusters 500 of produce. In some embodiments, a cluster 500 may include one or more products grown or disposed on a peduncle 502. In some embodiments, a cluster 500 may be considered a group and/or grouping of one or more products. The products may be coupled to the peduncle 502 via branches 504. In some embodiments, the peduncle 502 may be coupled to a stem and the stem may be coupled to a tree and/or trunk, one or more vines, or any other arrangement of one or more stems and branches. In some embodiments, a product may include a calyx 532 and the branch 504 coupled to the peduncle 502 may couple to the product via the calyx 532.

Figure 5A:
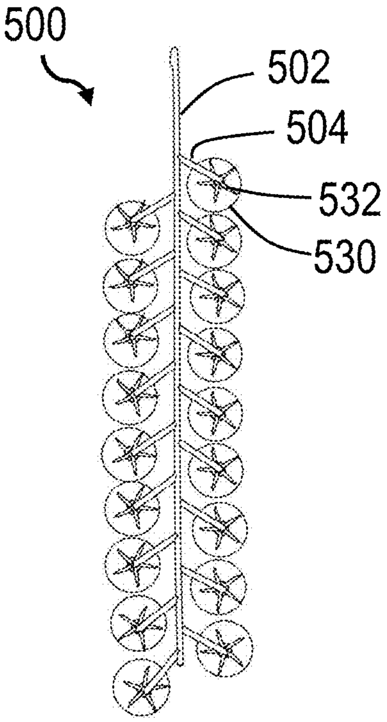
FIGS. 5A-5E are examples of some embodiments of different classes of clusters that may be harvested by the produce harvesting system.

FIG. 5A shows one embodiment of a non-angled cluster of produce. In some embodiments, the angle of a cluster 500 may be the angle of one or more calyces 532 of produce 530 relative to one or more selected from a longitudinal axis, lateral axis, or vertical axis of sensors 120 of the produce harvester 100, see FIG. 1. In some other embodiments, the angle of a cluster 500 may be the angle of one or more calyces 532 of produce relative to one or more selected from a longitudinal axis, lateral axis, or vertical axis of a reference frame of the produce harvester 100, the robotic limb 110, and/or the end effector 200. The angle of the calyces optionally may be determined at least in part through the eigenvectors associated with the cluster. In the shown embodiment, the angle of the non-angled cluster may be about 90 degrees or about 270 degrees. In some embodiments, detected angles of a cluster differing from 90 degrees or 270 degrees by an amount in the range of −15 degrees to 15 degrees may be used to classify a cluster as a non-angled cluster, though other ranges for classifying a non-angled cluster may also be used.

Figure 5B:
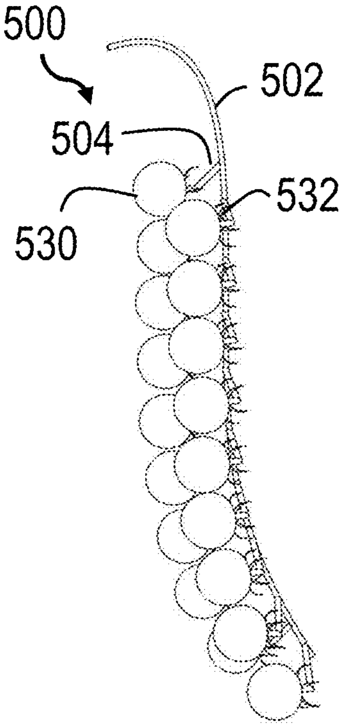

FIG. 5B shows one embodiment of an angled cluster of produce where the produce may be located on a single side of the peduncle relative to an orientation of the robot. The angle of a cluster 500 may be identified in the same manner described above. In the depicted embodiment, the angle of the angled cluster may be about 0 degrees or about 180 degrees. In some embodiments, detected angles of a cluster in the range of +/−15 degrees of the aforementioned angle may be used to classify a cluster as an angled cluster though ranges different from that noted above may also be used.

Figure 5C:
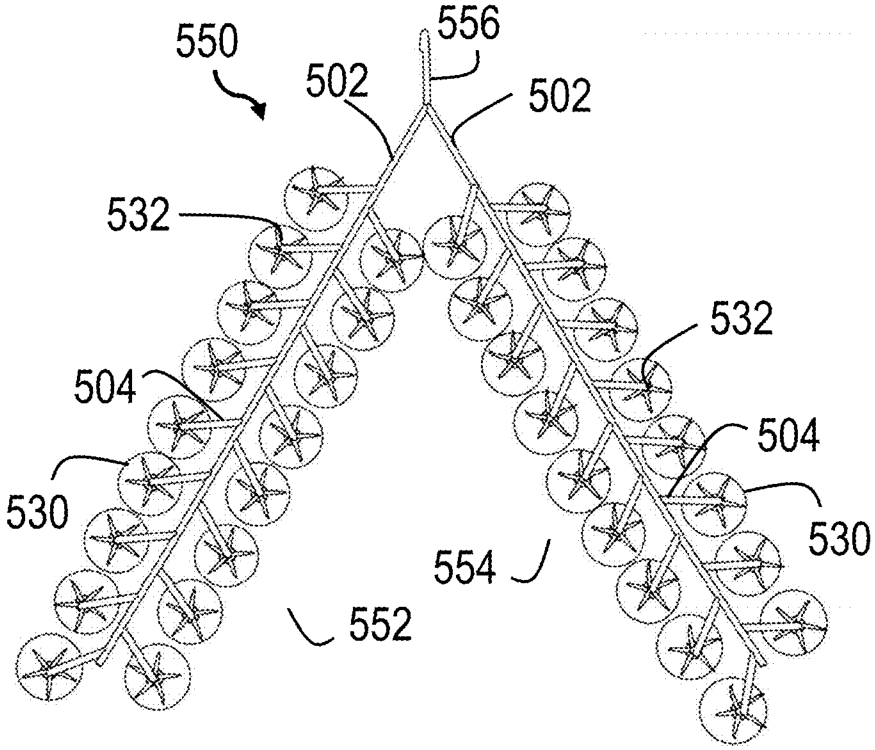

FIG. 5C shows a multiple cluster, which in the depicted embodiment, is a double cluster according to some embodiments. The double cluster 550 may include a first peduncle 552 containing one or more products and a second peduncle 554 containing one or more products. The first peduncle 552 and the second peduncle 554 may form a combined peduncle 556. In some embodiments, a double cluster 550 may include a cluster having more than one peduncle 502 containing two distinct groups of produce. For example, in some embodiments, a double cluster may include a cluster having two peduncles 502 containing a plurality of products 530. As detailed above, such multiple clusters 550 may be subdivided into separate clusters for each peduncle 502 for subsequent use with the planning algorithm detailed above. This may include determining an orientation of the individual clusters similar to what is described above relative to FIGS. 5A and 5B.

Figure 5D:
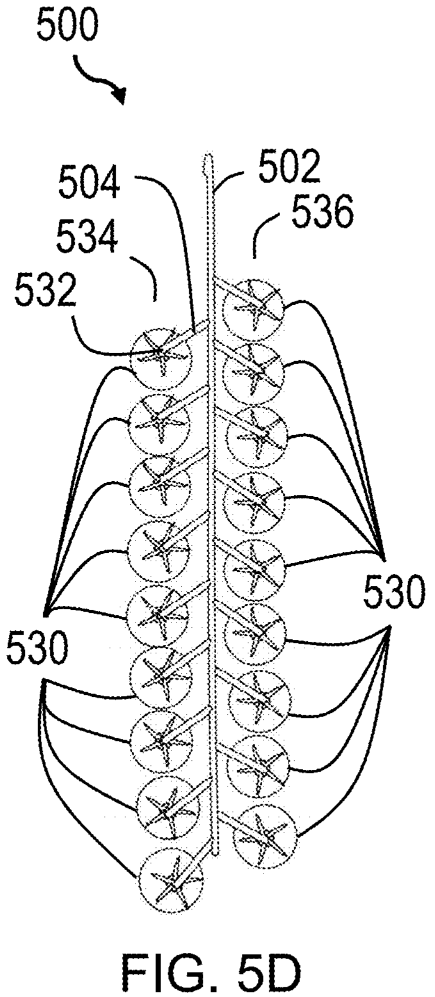

FIG. 5D shows one embodiment of a balanced cluster. In some embodiments, a balanced cluster may be a cluster 500 containing one or more products with an equal number of products on opposing sides of a peduncle. For example, in some embodiments, a cluster 500 may have a first side 534 of a peduncle 502 and a second side 536 of the peduncle 502 opposite the first side, and the first side 534 may include a first number of products 530, and the second side 536 may contain the same number of products 530. In the shown embodiment, a first side of a peduncle contains 9 products, and a second side of the peduncle contains 9 products.

Figure 5E:
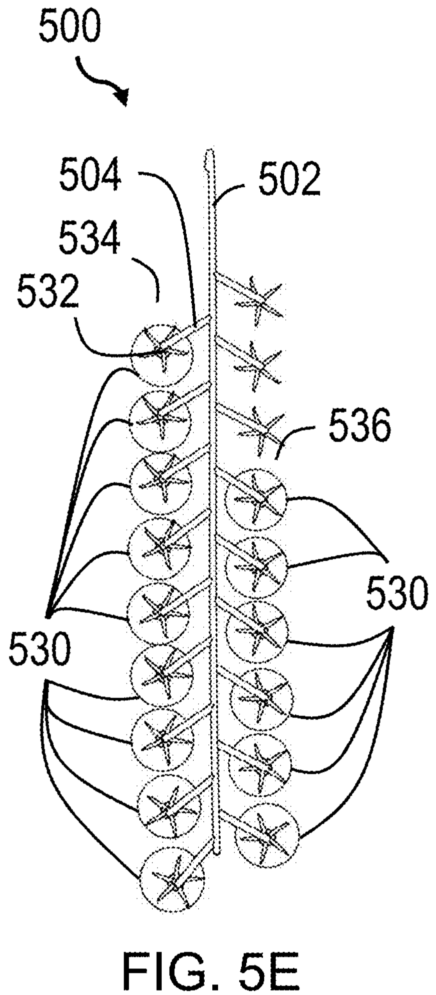

FIG. 5E shows one embodiment of an unbalanced cluster. In some embodiments, an unbalanced cluster may be a cluster 500 containing one or more products with an unequal number of products on opposing sides of a peduncle 502. For example, in some embodiments, a cluster 500 may have a first side 534 of a peduncle 502 and a second side 536 of the peduncle opposite the first side 534, and the first side 534 may include a first number of products 530, and the second side 536 may contain a different number of products 530. In the shown embodiment, a first side of a peduncle contains 9 products, and a second side of the peduncle contains 6 products.

A cluster may be classified as one or more of the above described types of produce arrangement. For example, in some embodiments, a cluster may be classified as angled, single, and unbalanced. However, other combinations of the above cluster classifications are also contemplated. Additionally, classifications for clusters other than those noted above are also contemplated as the disclosure is not so limited.

Figure 6A:
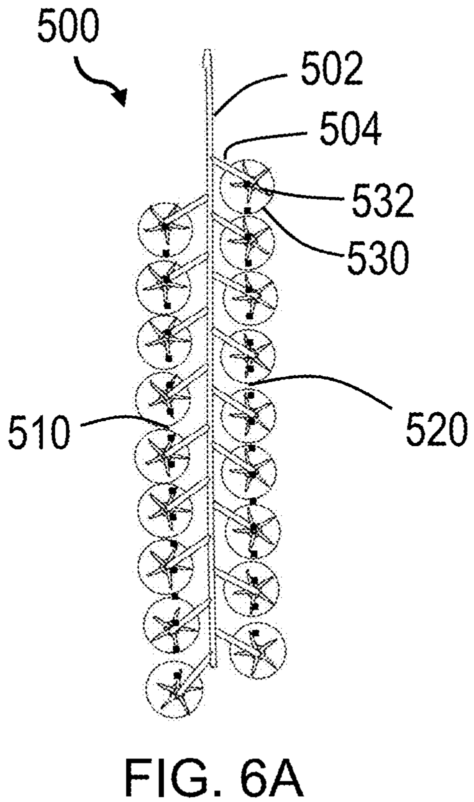
FIG. 6A is a front view of one embodiment of planned paths for an end effector overlayed on a cluster.
Figure 6B:
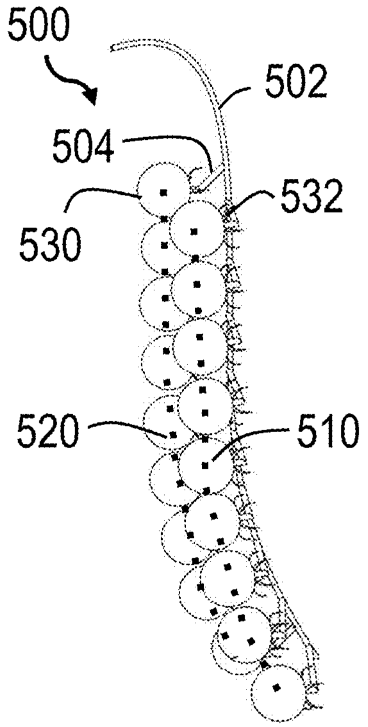
FIG. 6B is a side view of one embodiment of planned paths for an end effector overlayed on a cluster.

FIG. 6A is a front view of an example of planned paths according to some embodiments for the movement of an end effector overlayed on an exemplary cluster. FIG. 6B is a side view of the example of one embodiment of planned and/or generated paths for the end effector overlayed on the one embodiment of a cluster. In some embodiments, paths for an end effector 200 may include one or more paths. In further embodiments, the one or more paths may include a front line 510 and a back line 520. In some embodiments, the end effector 200 may follow the one or more paths in a downward direction. The front line 510 may relate to a first side of a peduncle 502 containing one or more products 530 and the back line 520 may relate to a second side of the peduncle containing one or more products. In some embodiments, the front line 510 and the back line 520 may be substantially vertical. In some other embodiments, the front line 510 and the back line 520 may not be vertical due to one or more obstacles obstructing the front line 510 and/or the back line 520. In some embodiments, the one or more paths may be generated based at least partly on the identified type and/or classification of produce arrangement and/or cluster. In some embodiments, the one or more paths may include a first path extending between sequentially located produce on a first side of the peduncle. In some embodiments, the one or more paths may include a second path extending between sequentially located produce on a second side of the peduncle. In some embodiments, the end effector 200 may be controlled to follow the one or more paths. In some embodiments, the one or more paths extend through multiple pieces of produce. In some embodiments, the one or more generated paths may extend through the centers of the one or more products. In further embodiments, the one or more generated paths may extend through the centers of the calyces of the one or more products. By the creation of the aforementioned paths, the speed of the picking motion may be faster than a path which would have individually picked, and then placed, a singular product with each individual path.

Figure 7A:
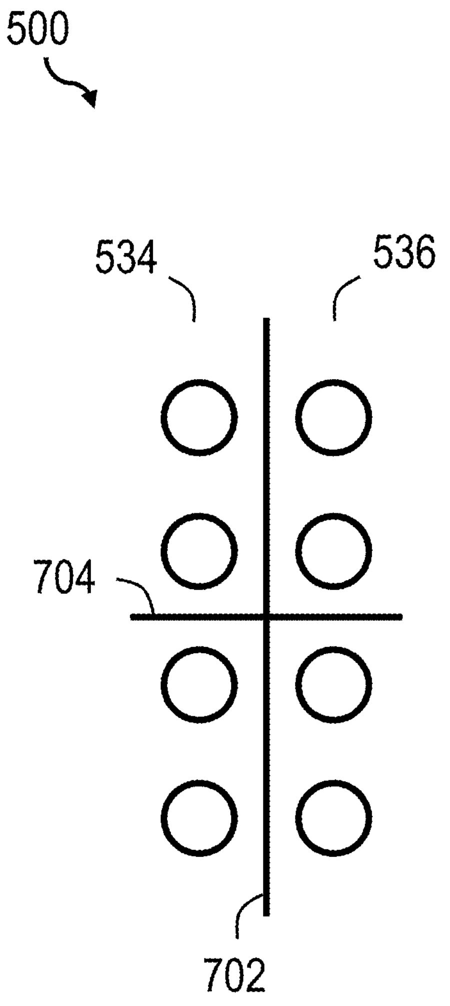
FIG. 7A-7B show a top and side view of eigenvectors according to some embodiments overlayed on a corresponding cluster of produce according to some embodiments.
Figure 7B:
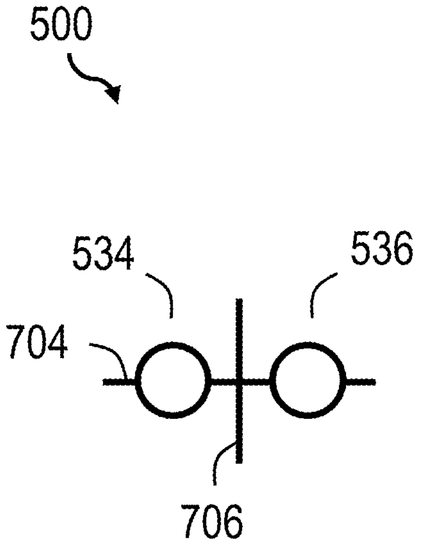

FIG. 7A and FIG. 7B show an example of one embodiment of one or more eigenvectors overlayed on one embodiment of a corresponding cluster of produce 500. FIG. 7A may show a side view and FIG. 7B may show a top view of the same cluster of produce 500. The cluster of produce 500 may include a first side 534 and an opposing second side 536. A major eigenvector 702 may be located between the first side 534 and the second side 536. In some embodiments, the major eigenvector 702 may be described as being formed in a direction parallel to the length (i.e., a longest dimension) of the cluster 500. In further embodiments, the major eigenvector 702 may be formed in a direction parallel to a peduncle of the cluster of produce 500. A middle eigenvector 704 may be formed between upper portions of the first side 534 and the second side 536 of the cluster and lower portions of the first side 534 and the second side 536 of the cluster. In some embodiments, the middle eigenvector 704 may be formed between upper halves of the first side of the cluster 534 and the second side of the cluster 536 and lower halves of the first side of the cluster 534 and the second side of the cluster 536. In further embodiments, the middle eigenvector 704 may be described as being formed in a direction perpendicular to the major eigenvector 702. In even further embodiments, the middle eigenvector 704 may be described as being formed in a direction parallel to a width of the cluster of produce 500. A minor eigenvector 706 may be formed between the first side of the cluster 534 and the second side of the cluster 536. In some embodiments, the minor eigenvector 706 may be formed in a direction perpendicular to both the major eigenvector 702 and the middle eigenvector 704. Thus, in some embodiments, the major eigenvector 702, the middle eigenvector 704, and the minor eigenvector 706 may all be perpendicular to one another. Thus, the middle eigenvector 704 may extend in a direction parallel to a depth and/or thickness of the cluster of produce 500. The middle eigenvector 704 may also extend in a direction of one or more calyces of the first side of the cluster 534 and the second side of the cluster 536. In some embodiments, the major eigenvector 702 may be extended further than the middle eigenvector 704 and or the minor eigenvector 706. Thus, the major eigenvector 702 may be associated with and extended in a direction including more produce than the middle eigenvector 704 and/or the minor eigenvector 706.

Figure 8A:
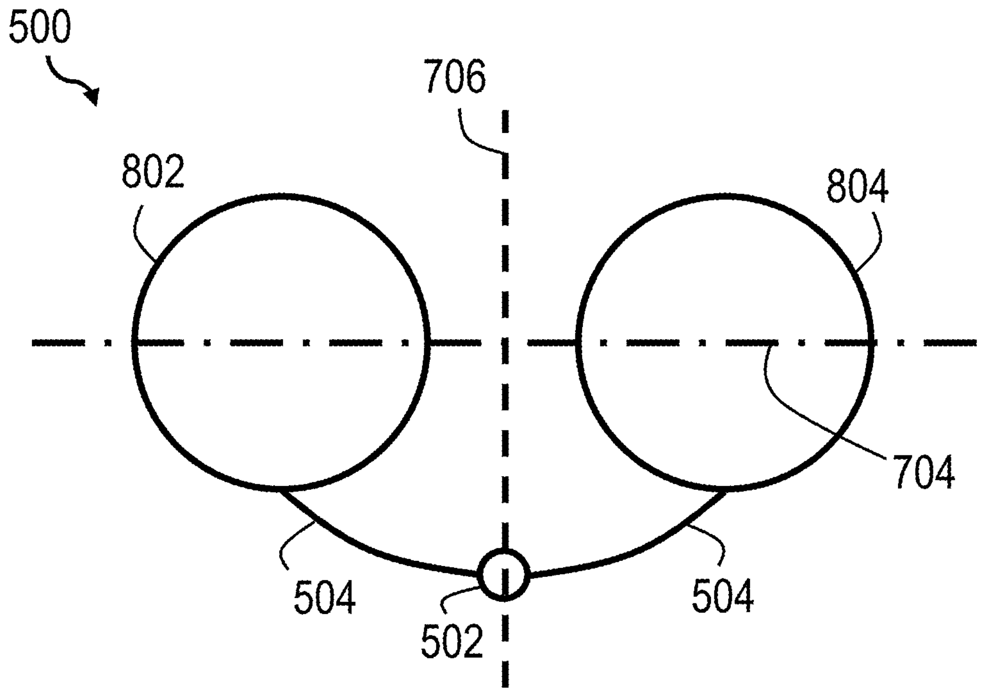
FIG. 8A is a cross-sectional view of eigenvectors according to some embodiments overlayed on a corresponding cluster of produce according to some embodiments.
Figure 8B:
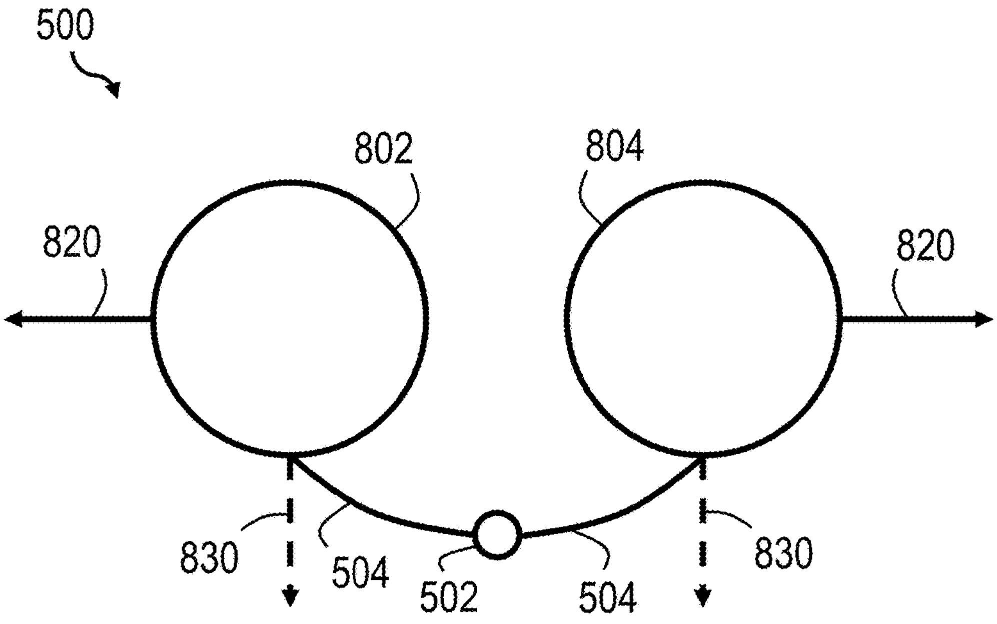
FIG. 8B is the cross-sectional view of produce to be harvested according to some embodiments displaying Euler angles related to the produce according to some embodiments.
Figure 8C:
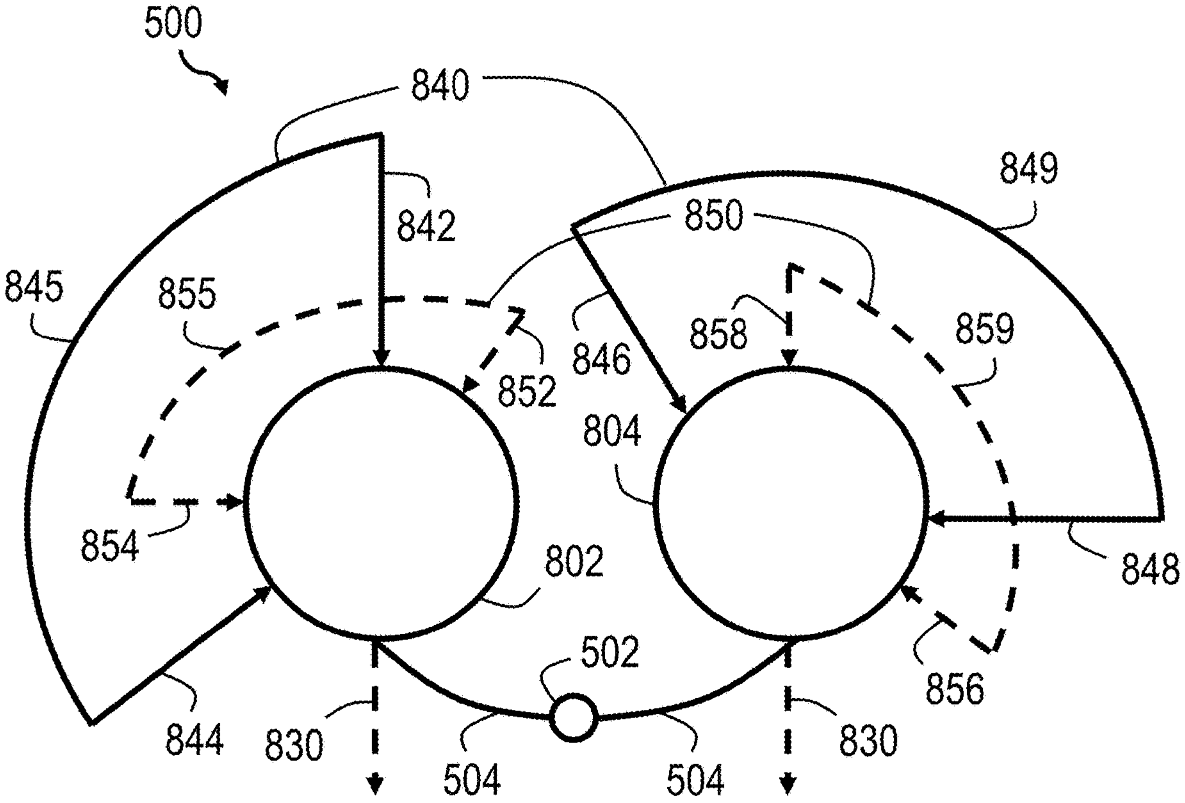
FIG. 8C is the cross-sectional view of produce to be harvested according to some embodiments with corresponding orientation ranges related to the produce according to some embodiments.

FIG. 8A is a cross-sectional view of eigenvectors according to some embodiments overlayed on a corresponding cluster of produce 500 according to some embodiments. FIG. 8B is the cross-sectional view of produce to be harvested according to some embodiments displaying Euler angles related to the produce according to some embodiments. FIG. 8C is the cross-sectional view of produce to be harvested with corresponding orientation ranges related to the produce according to some embodiments. A portion of a cluster of produce 500 to be harvested may include a first product 802 and a second product 804 coupled to a peduncle 502 via peduncle branches 504. One or more calyces may be disposed in the location in which the branches 504 couple to the first product 802 and the second product 804. For example, a calyx associated with the first product 802 may be coupled to the first product 802 in the location in which the branch 504 contacts the first product 802. Determining the orientation of the first product 802 and second product 804 and/or peduncle 502 may help to generate one or more harvesting paths. A middle eigenvector 704 and a minor eigenvector 706 associated with the produce cluster 500 as previously described may be generated as illustrated in FIG. 8A. A product to be harvested may be considered as a rigid body. Thus, Euler angles may be used to describe the orientation of a rigid body. Three Euler angles may completely describe the orientation of the rigid body and may be referred to as a middle Euler angle 820, a minimum Euler angle 830, and a maximum Euler angle.

In some embodiments, the minimum Euler angles 830 may be formed in a direction parallel to the minor eigenvector 706. Thus, determining the minor eigenvector 706 as detailed above may be used to determine the minimum Euler angle 830. The minimum Euler angle 830 may also be centered about the calyx coupled to a product. For example, a minimum Euler angle 830 associated with the first product 802 may be parallel to the minor eigenvector 706 and be centered about a calyx coupled to the first product 802 at the location where the branch 504 contacts the first product 802.

In some embodiments, the middle Euler angle 820 may be directed along an axis extending through the center of two products on opposing sides of the peduncle. The middle Euler angles 820 may be collinear with the middle eigenvector 704 which may be determined using any of the methods disclosed herein. The middle Euler angle 820 may also be associated with a direction directed outward from the product relative to the peduncle 502. The middle Euler angle 820 may also be described as pointing in a direction away from and/or opposite the peduncle 502.

In some embodiments, the maximum Euler angle may be directed along an axis extending through the center of the first product 802 and the second product 804 on opposing sides of the peduncle 502. The maximum Euler angle may not be visible in a cross-sectional view where the middle Euler angle 820 and the minimum Euler angle 830 are visible. In some embodiments, the maximum Euler angle may be collinear with the major eigenvector 702 which may be determined using any of the associated methods disclosed herein.

When the end effector 200 harvests produce, there may be potential for unintentionally knocking produce off of a peduncle 502 and/or stem by the end effector 200 during harvesting of that product and/or adjacent products. Produce that has been separated and/or knocked off of the peduncle 502 may not be collected or stored by the produce harvester 100 and may be discarded as waste. Additionally, in some embodiments, if the distal portion of the end effector 200 contacts the calyx 532, the end effector 200 could move the product out of harvesting range of the end effector 200. If the product is moved out of range, the product may not be harvested. Because of the interconnected nature of the produce (e.g., products are coupled to a common peduncle 502 via branches 504), unintentional contact with the calyx of a first product may result in undesired motion of one or more other products located on the same or a different peduncle, which may contribute to failed harvesting of other produce. Avoiding unintentional contact with produce therefore may be desirable. The end effector 200 may be oriented while following a generated path such that unintentional contact with produce and/or unintended force application to produce is reduced or avoided. Specifically, orientations of the end effector 200 may be determined to avoid, at least in part, contact between the end effector 200 and the calyx 532 of one or more pieces of produce 530 to be harvested. In some embodiments, possible orientations of the end effector 200 may be generated in the form of ranges. Generating ranges of possible orientations may allow for selection of one or more preferable orientations from the generated ranges. In some embodiments, the angle of orientation of the end effector 200 may be defined relative to an axis that is collinear with the major eigenvector 702 associated with the cluster. In some embodiments, a first orientation range 845 associated with a first side of a cluster 500 may be generated and a second orientation range 849 associated with a second side of a cluster 500 may be generated. The first orientation range 845 and the second orientation range 849 may form a first set of orientation ranges 840. In some embodiments, depending on the current orientation of the end effector 200 and the orientation of a cluster 500, more than one set of orientation ranges may be used. For example, in some embodiments, a second set of orientation ranges 850 may also be generated for the end effector 200 to follow during harvesting. For example, the first set of orientation ranges 840 may be used if the end effector 200 is closer to a roll orientation of about 180° and the second set of orientation ranges may be used if the end effector 200 is closer to a roll orientation of about 0°. In some embodiments, the sets of orientation ranges may vary depending at least in part on whether a line of produce is the front line 510 or the back line 520 of a cluster 500. In some embodiments, the sets of orientation ranges may the vary depending at least in part on the location of the calyces.

In some embodiments, an orientation range 845 may be generated using angular offsets from the vector of the minimum Euler angle 830 to determine a minimum angle 842 and a maximum angle 844 for a first side of the cluster. Another second orientation range 849 for the second side of the cluster may be generated in the same manner to determine a minimum angle 848 and maximum angle 846 for the second side of the cluster 500. In some embodiments, a second set of orientation ranges 850 may be generated in the same manner as the first set of orientation ranges 840 for use when a roll orientation of the end effector is closer to 0°, or other predetermined angle.

In some embodiments, a first orientation range 855 associated with a first side of a cluster 500 may be generated and a second orientation range 859 associated with a second side of a cluster 500 may be generated. The first orientation range 855 and the second orientation range 859 may form a first set of orientation ranges 850. In some embodiments, the orientation range 855 may be generated using angular offsets from the vector of the minimum Euler angle 830 to determine a minimum angle 852 and a maximum angle 854 for a first side of the cluster. Another second orientation range 859 for the second side of the cluster may be generated in the same manner to determine a minimum angle 858 and maximum angle 856 for the second side of the cluster 500. In some embodiments, the second set of orientation ranges 850 may be generated in the same manner as the first set of orientation ranges 840 for use when a roll orientation of the end effector is closer to 0°, or other predetermined angle.

As noted above, the angle ranges for controlling a yaw orientation of an end effector as it travels along a commanded harvesting path, may be determined as a range of angles offset from a vector of minimum Euler angle of a cluster. While these angle ranges may vary depending on end effector geometry, overall yaw orientation relative to a cluster of produce to be harvested, and a side of a cluster a commanded path is associated with, in some embodiments, the commanded yaw angle may be offset from the minor Euler angle by greater than or equal to 30°, 45°, 60°, 90°, 120°, 150°, 180°, 210°, and/or any other appropriate range of angles. The commanded yaw angle may also be offset from the minor Euler angle by less than or equal to 330°, 315°, 300°, 270°, 240°, 210°, 180°, 150°, 120°, 90°, and/or any other appropriate range of angles. Combinations of the above-noted ranges are contemplated including, for example, a commanded yaw angle that is offset from a minor Euler angle by an amount that is between or equal to 30° and 330°, 30° and 210°, and/or any other appropriate combination of foregoing. Of course, while specific ranges of angles are noted above, it should be understood that ranges both greater than and less than those noted above are also contemplated as the disclosure is not limited in this fashion.

Figure 9:
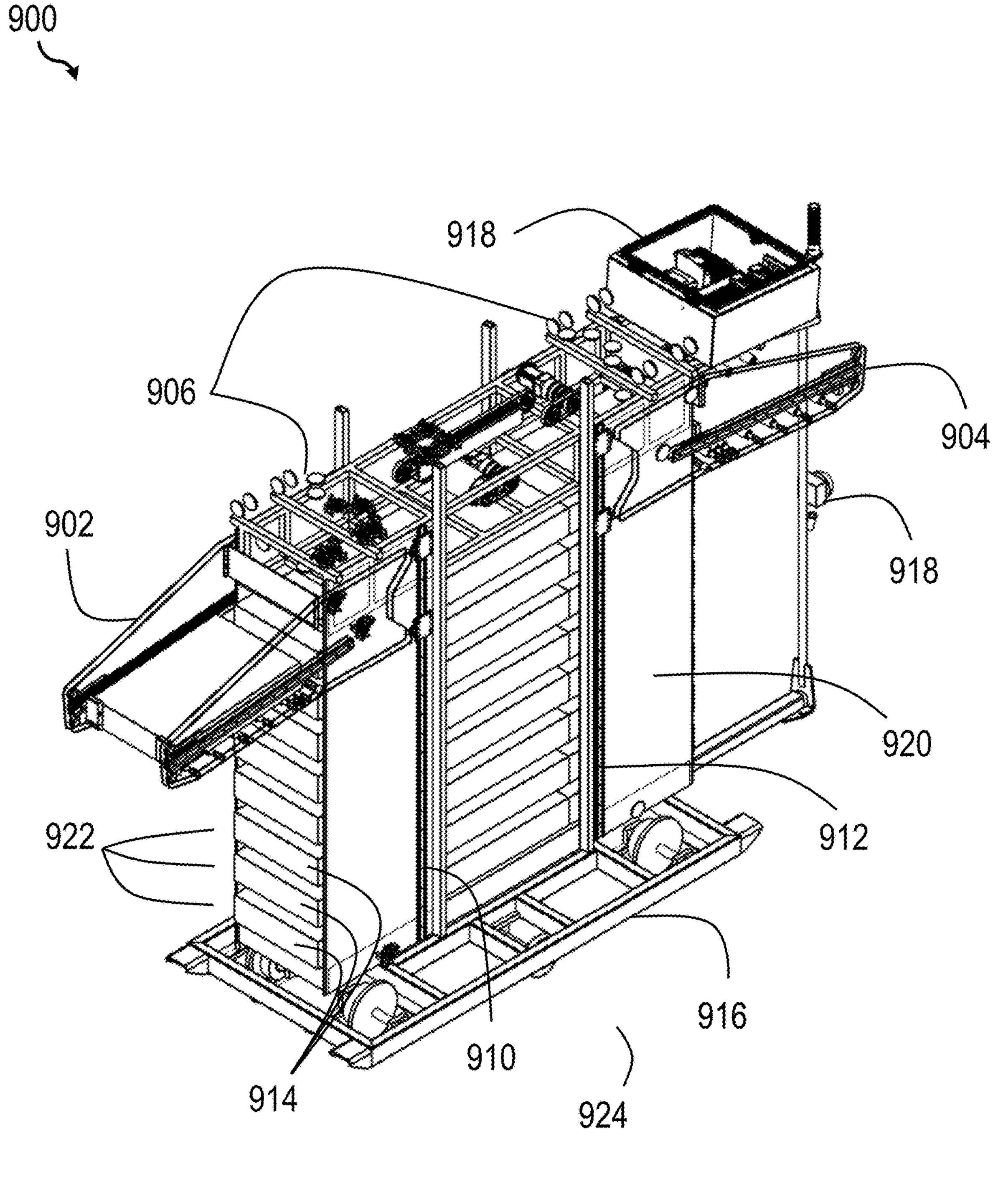
FIG. 9 is a perspective view of one embodiment of a produce packing cart for use in a produce harvesting system.

FIG. 9 is a perspective view of one embodiment of a produce packing cart 900 for use in a produce harvesting system. The produce packing cart 900 may include frame 920 having a plurality of shelves 922 coupled or otherwise formed in the frame 920. Each of the plurality of shelves 922 may be configured to hold one or more containers 914 which may be filled or unfilled. The shelves 922 may be vertically aligned, with each shelf 922 disposed at a different vertical position. Each shelf 922 may include a plurality of rails coupled to the shelf 922 configured to slidingly support the containers 914, though other embodiments using shelves with rollers, ball bearings, wheels, low friction surfaces, and/or other appropriate configuration to permit the containers to be slide through the shelves may be used. A first elevator 902 and second elevator 904 may be coupled to the frame 920 on opposing sides of the plurality of shelves such that a first opening of each shelf is oriented towards the first elevator and a second opening of each shelf is oriented towards the second elevator. The first elevator 902 and second elevator 904 may include one or more motors, rails, leadscrews, chains, belts, shafts, pulleys, solenoids, wire ropes, combinations of the forgoing, or any other appropriate elevator actuator configured to move the elevators in a vertical direction. For example, one or more pulley assemblies 706 coupled to the corresponding elevator and a motor may be used to control motion of the first elevator 902 and second elevator 904. The first elevator 902 and second elevator 904 may also include one or more container actuators that are configured to move one or more containers 914 disposed on an elevator into an adjacent shelf 922 located adjacent to the elevator.

As noted above, the first elevator 902 may be associated with a first side of the shelves 922 and the second elevator 904 may be associated with a second side of the shelves 922. Thus, moving the one or more containers 914 from one of the elevators into an adjacent shelf 922 may move one or more containers 914 already disposed on the adjacent shelf 922 onto the opposing elevator 904. This may be done to selectively move containers between the shelves and elevators to move containers within the packing cart as elaborated on further below. For example, such a process may be used to control the movement of filled and unfilled containers to and from the shelves 922 until each individual shelf 922, and the overall packing cart, are filled with a desired number of filled containers 914. To facilitate this control, the first elevator 902 and second elevator 904 may move to any position between a bottom shelf to a top shelf. The control for such a filling process is detailed further below.

Figure 11A:
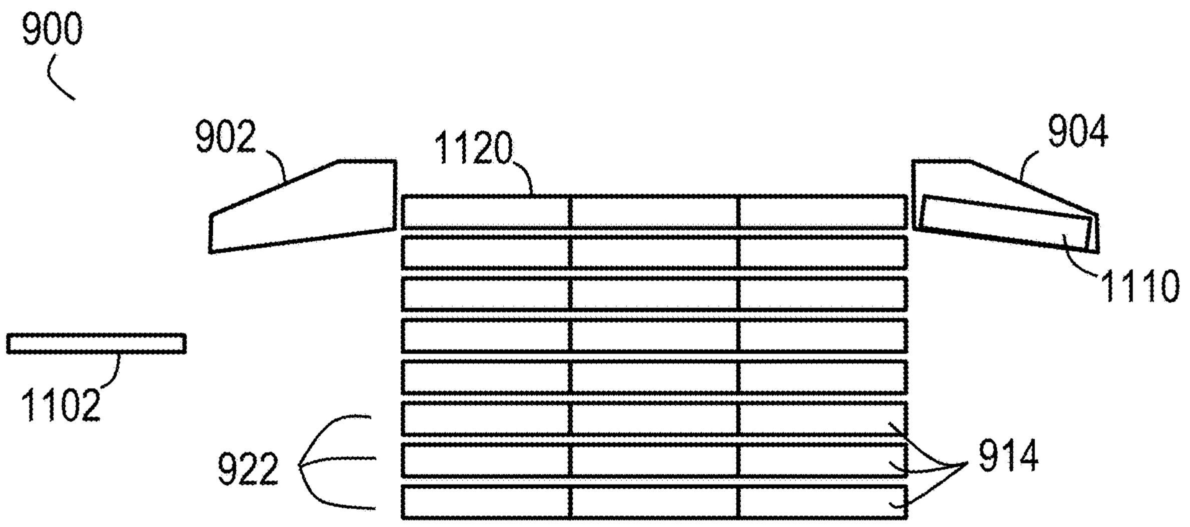
FIGS. 11A-11N are a series of views of one embodiment of a produce packing cart demonstrating a sequence for packing containers of produce.
Figure 11B:
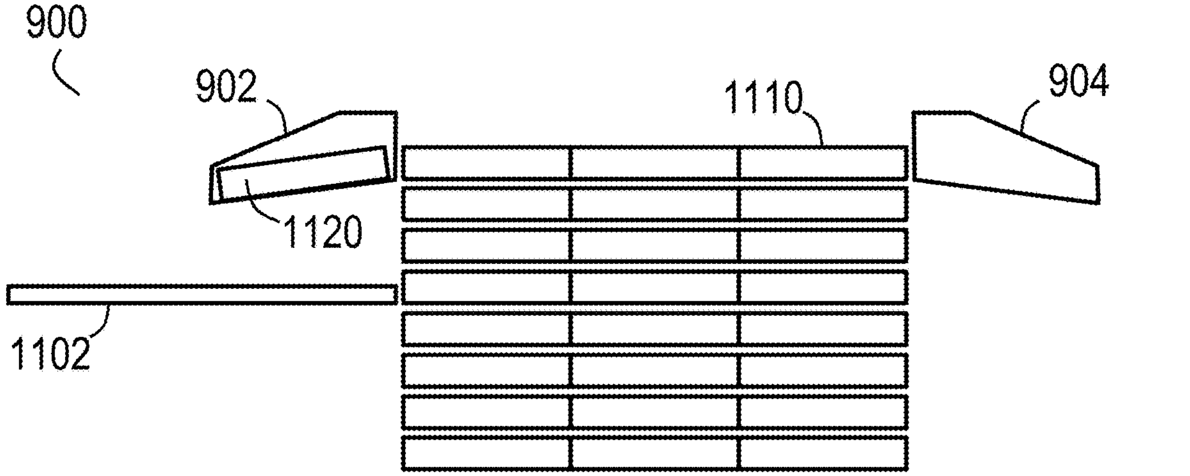
Figure 11C:
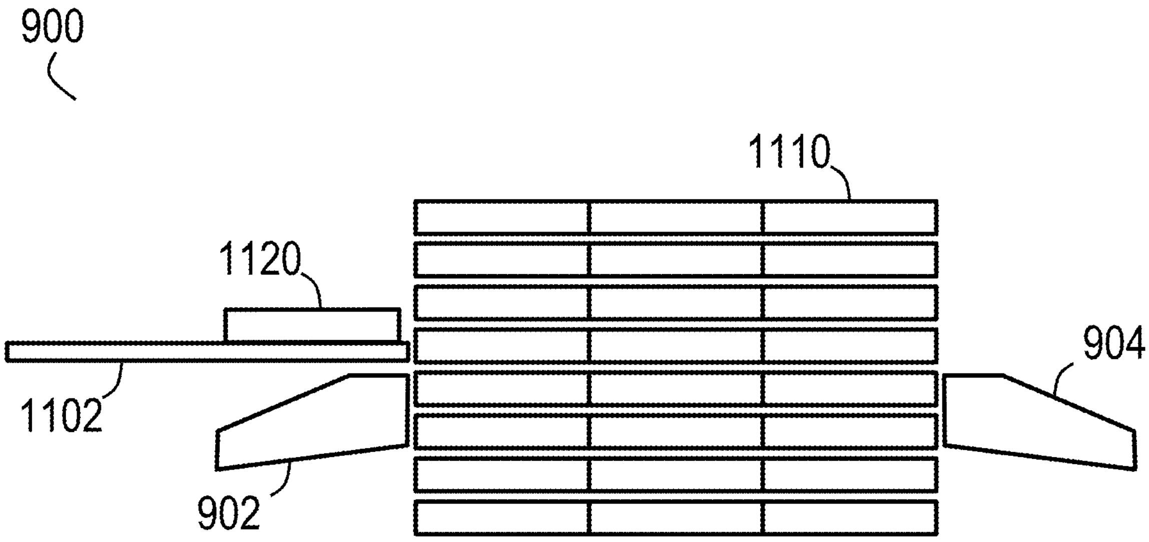
Figure 11D:
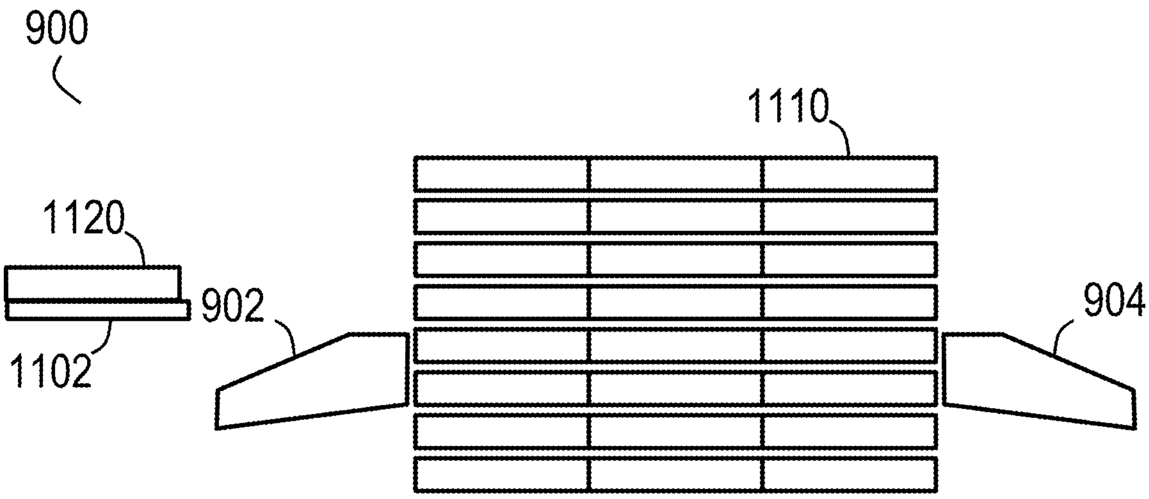
Figure 11E:
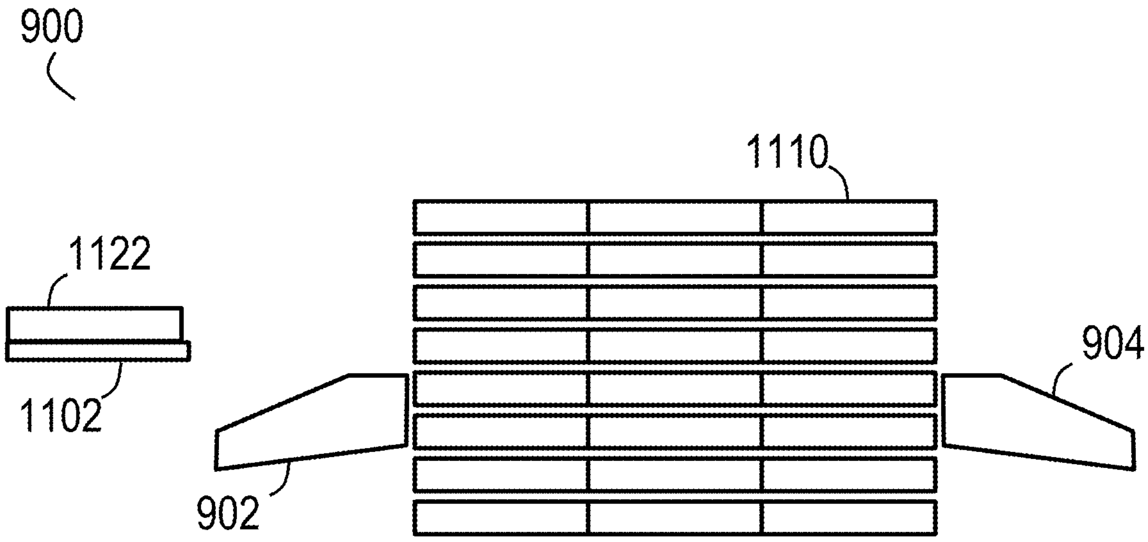
Figure 11F:
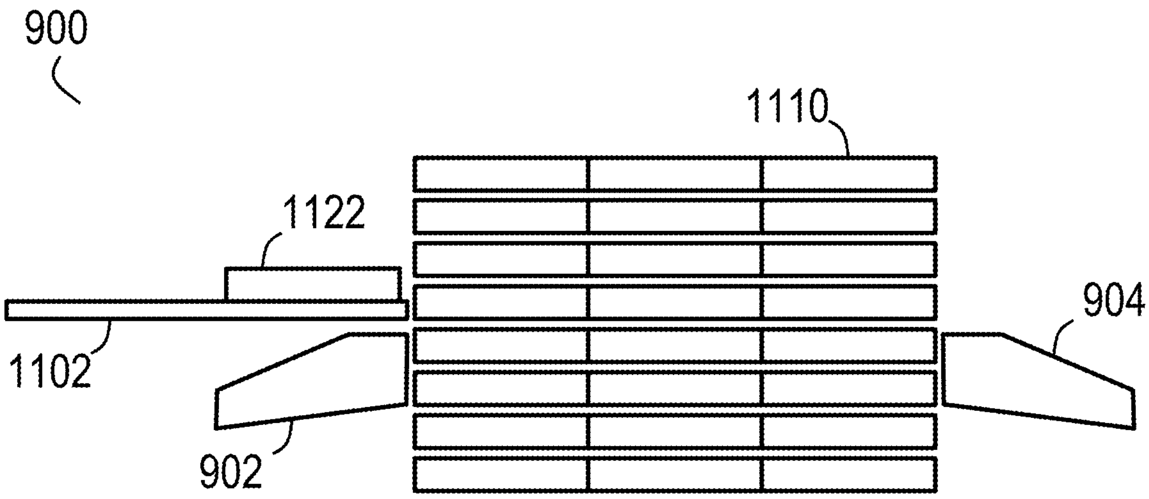
Figure 11G:
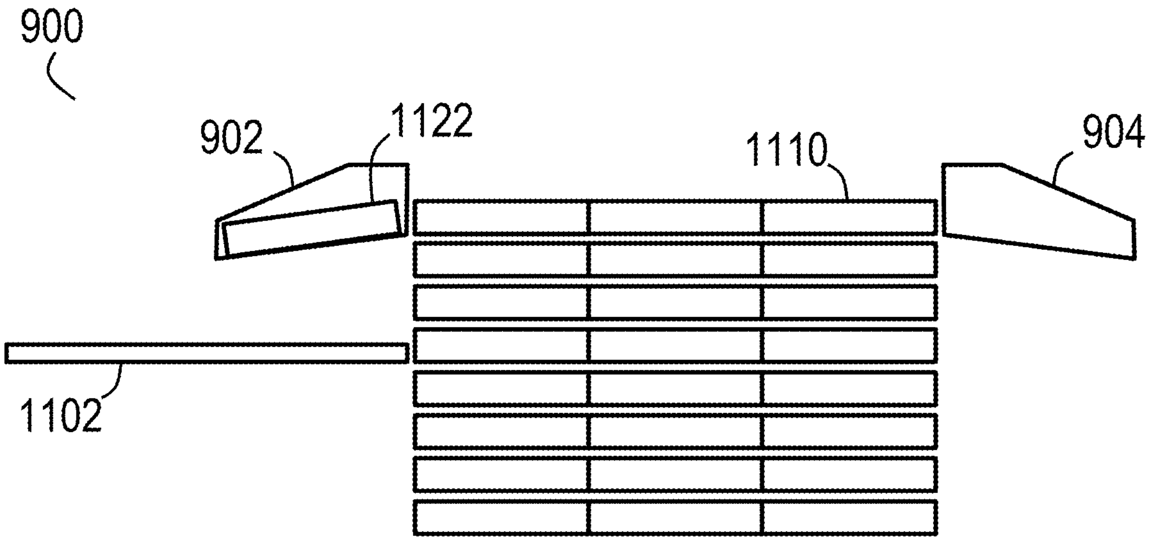
Figure 11H:
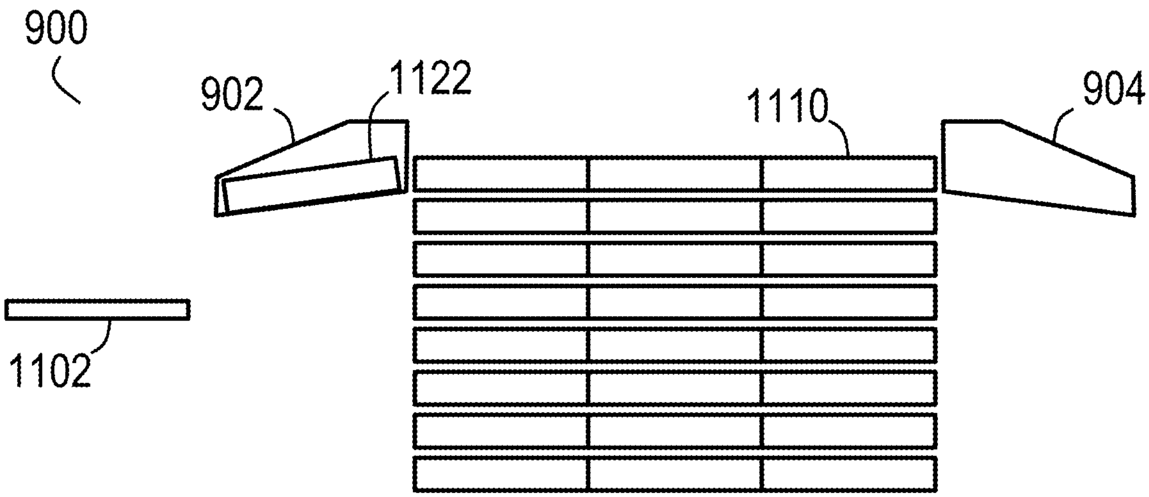
Figure 11I:
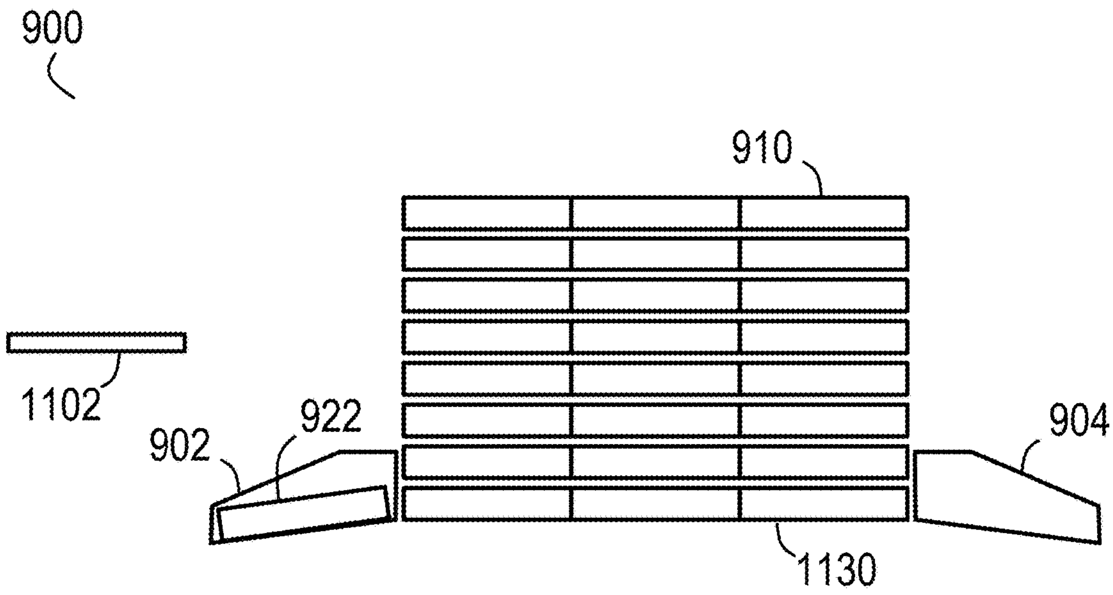
Figure 11J:
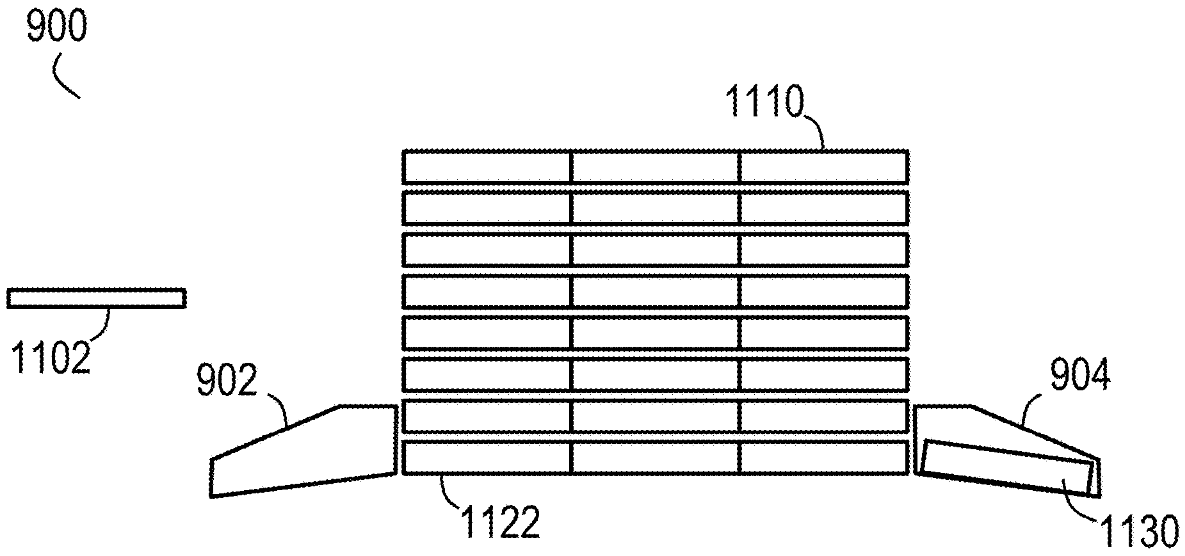
Figure 11K:
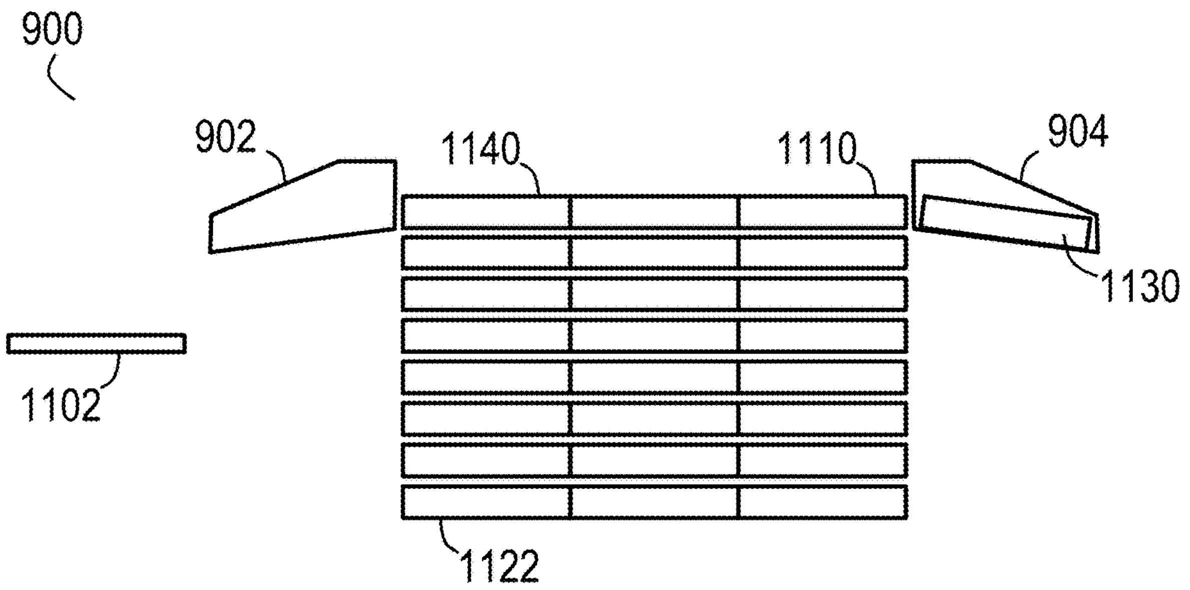
Figure 11L:
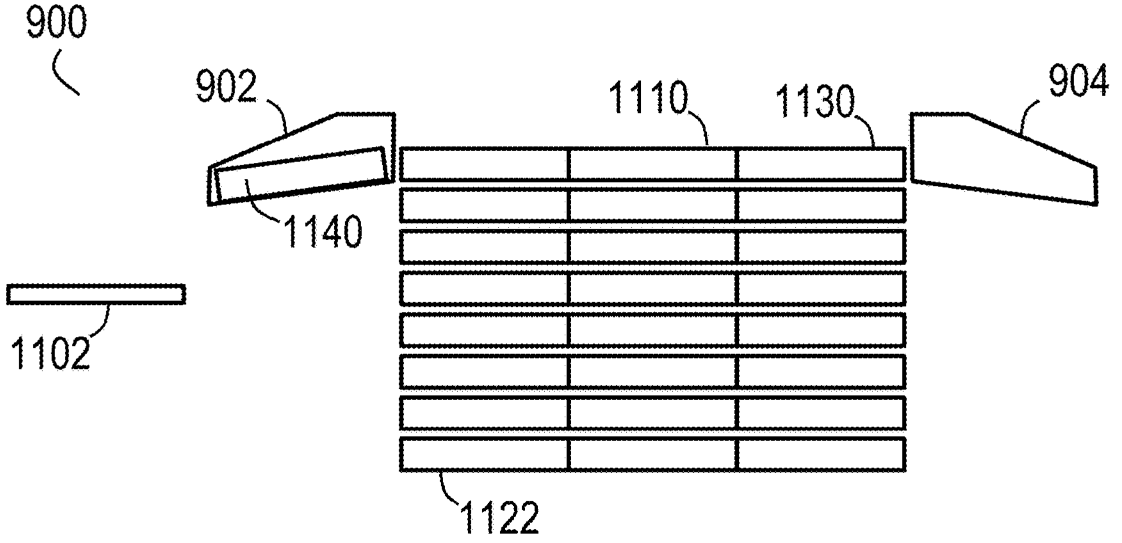
Figure 11M:
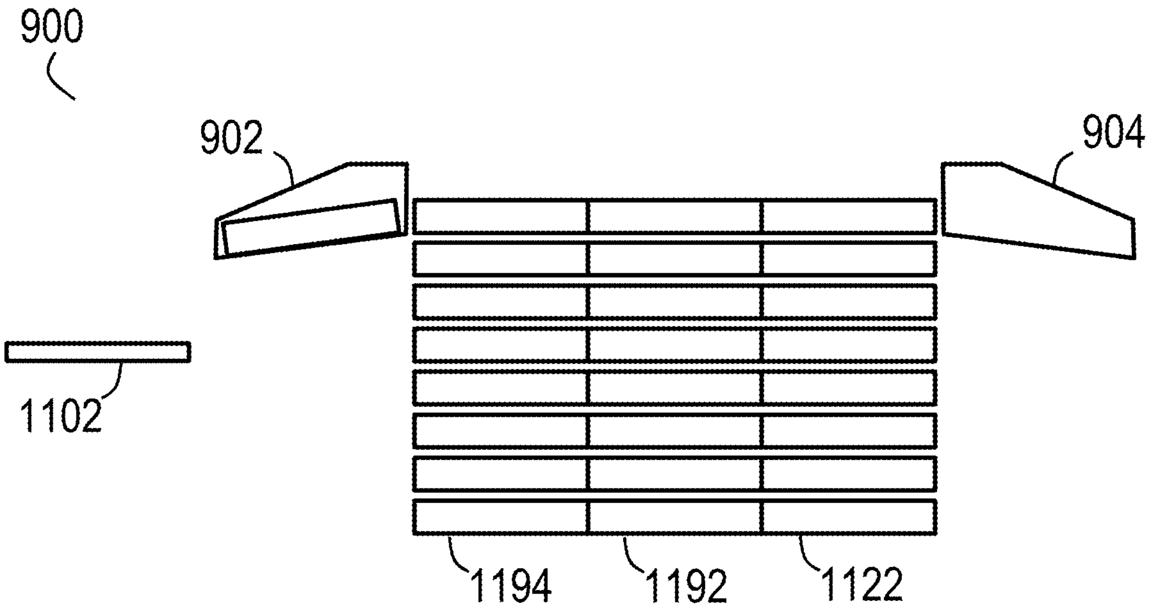
Figure 11N:
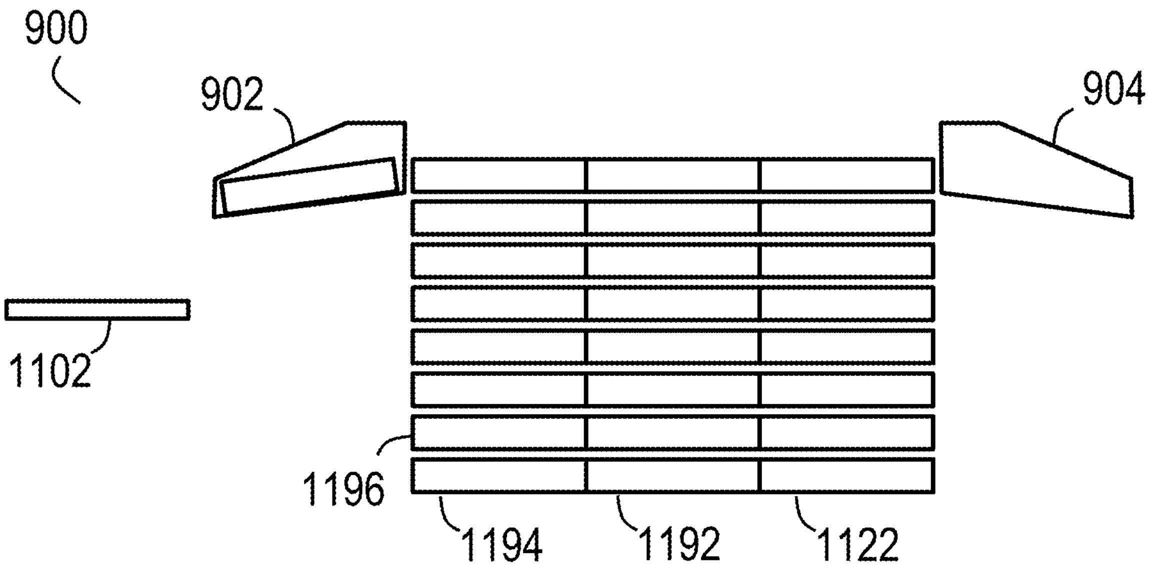

To facilitate interfacing with a produce harvester to both supply empty containers and retrieve filled containers, in some embodiments, the first elevator 902 may be configured to provide empty containers 914 to, and retrieve filled containers 914 from, a platform 1102, see FIGS. 1 and 11A-11N. The platform 1102 may configured to support one or more containers 914. The platform 1102 may also be movable between an extended and retracted configuration using a platform actuator, not depicted. An unfilled container 914 disposed on the platform 1102 may be filled by the produce harvester 100 when the platform is in the retracted configuration. The platform may include one or more sensors configured to measuring the weight of the container held on the platform 1102. In some embodiments, the measured weight of the container on the platform 1102 in the retracted configuration may be used to control the movement of the platform 1102 between the retracted configuration and the extended configuration. In the extended configuration, the platform 1102 may configured to interface with the first elevator 902 to either accept an unfilled container from the first elevator and/or to transfer a filled container to the first elevator as elaborated on further below.

In some embodiments, a plurality of wheels 924 may be coupled to the frame 920 or other portion of the packing cart 900. The wheels may allow the packing cart 900 to be transported along a floor surface. In further embodiments, the packing cart 900 may include a first and second set of wheels. The first set of wheels may allow the packing cart 900 to be transported along a relatively flat surface. The second set of wheels may engage with rails, allowing transportation of the produce packing cart 900 along a track or path of rails.

In some embodiments, the produce packing cart 900 may include a controller 918 operatively coupled with the first elevator 902, the second elevator 904, and the one or more container actuators. The controller 918 may control movement of the elevators and the one or more actuators that move the containers 914 between the elevators and adjacent shelves 922. The controller may include one or more processors and associated non-transitory computer readable memory including processor executable instructions that when executed perform any of the methods disclosed herein. The controller 918 may also control the actuators that move the first elevator 902 and the second elevator 904 between the bottom shelf and top shelf.

In even further embodiments, the produce stored in the produce packing cart 900 may be tomatoes. In even further embodiments still, the produce stored by the produce packing cart 900 may be snacking tomatoes. In yet further embodiments, the produce stored by the produce packing cart 900 may be apples.

Figure 10:
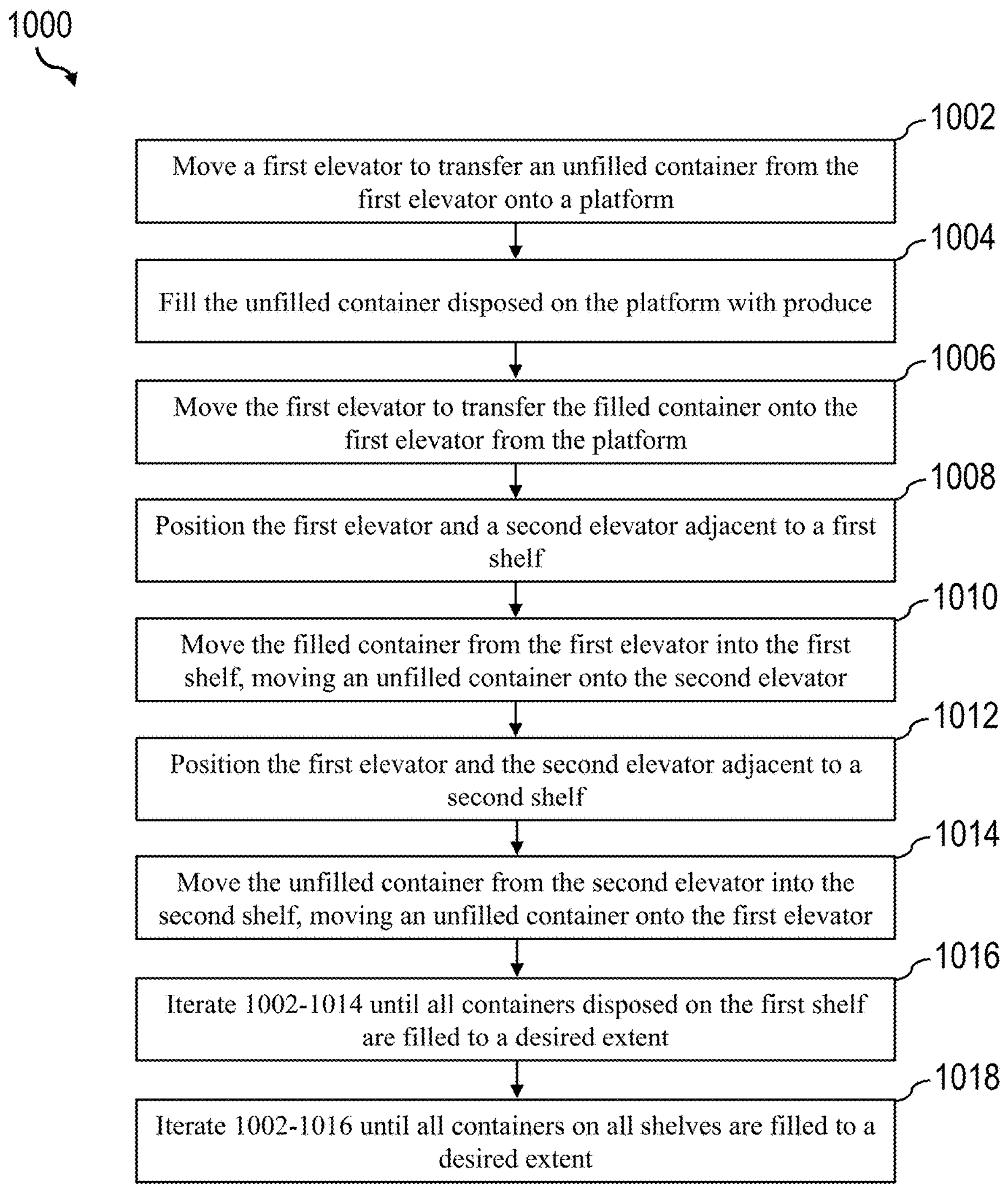
FIG. 10 is a flow chart for one embodiment of a method of controlling a produce packing cart for use in a produce harvesting system.

Unfilled containers 914 may be provided to the automatic harvesting system 100 by a produce packing cart 900 and containers 914 filled with produce may be removed from the automatic harvesting system 100 and provided to the produce packing cart 900. The packing cart 900 may automatically store the filled containers 914 and automatically provide the unfilled containers 914 to the produce harvesting system 100. In some embodiments, the packing cart 900 may be used within greenhouses and/or other farming environments. One possible implementation of such a method 1000 is shown in FIG. 10.

At 1002, a first elevator may move to transfer an unfilled container from the first elevator to the platform at a loading position. In some embodiments, the first elevator may move downwards to transfer the unfilled container onto the platform while the platform is in an extended configuration, though other transfer methods may also be used. At 1004, the unfilled container on the platform may be moved to a retracted configuration, or the container may otherwise be positioned, such that the container may be filled by a produce harvester. At 1006, the first elevator may be moved to transfer the filled container from the platform onto the first elevator. In some embodiments, the platform may be in an extended configuration while the first elevator moves to transfer to the filled container onto the first elevator. At 1008, the first elevator and the second elevator may be positioned adjacent to a first shelf. In some embodiments, the adjacent shelf may be aligned horizontally with the first elevator and the second elevator. At 1010, the filled container may be moved from the first elevator into the first shelf. This may correspondingly move an unfilled container from the first shelf onto the second elevator. In some embodiments, the filled container may be moved through a first opening of the first shelf onto the first shelf which may displace one or more containers disposed in the shelf such that a container located adjacent to an opposing second opening of the first shelf to move onto the second elevator. In some embodiments, the container displaced onto the second shelf is an empty container.

At 1012, the first elevator and the second elevator may be moved such that they are positioned adjacent to a second shelf. In some embodiments, the second shelf may include an unfilled container disposed on the second shelf and adjacent to the first elevator. At 1014, the unfilled container may be moved from the second elevator into the second shelf, moving the unfilled container adjacent to the first elevator from the second shelf onto the first elevator. At 816, it may be determined whether or not the current shelf being loaded with filled containers still includes empty containers. For example, this may be done using imaging sensors, a known number of containers per shelf, or other appropriate method. In either case, steps 1002-1014 may be repeated until all containers disposed on the first shelf are filled, or a desired quantity of filled containers are disposed on the first shelf. At 1018, a new shelf to be filled may be defined and steps 1002-1016 may be repeated for this new shelf. The method may continue until all shelves are filled, or a until a desired quantity of filled containers, is provided.

FIGS. 11A-11N are a series of views of one embodiment of a produce packing cart 900 demonstrating a sequence for packing containers of produce onto the packing cart consistent with the method described above relative to FIG. 10.

Turning to FIG. 11A, the packing cart 900 may have a plurality of shelves 922 with a plurality of containers 914 disposed thereon. A platform 1102 may be in a retracted configuration. The first elevator 902 and the second elevator 904 may be positioned adjacent a shelf at a position above the platform 1102. A first unfilled container 1110 may be disposed on the second elevator 904. A second unfilled container 1120 may be disposed on the adjacent shelf in a position proximate to the first elevator 902.

Turning to FIG. 11B, the unfilled container 1110 may be moved from the second elevator 904 through a second opening of the adjacent shelf onto the adjacent shelf, moving unfilled container 1120 through a first opening onto the first elevator 902. The platform 1102 may transition to from the retracted configuration to an extended configuration. In some embodiments, the first elevator 902 may be in a loading position when the first elevator 902 is adjacent to a second shelf.

Turning to FIG. 11C, the first elevator 902 may lower to a position below the platform 1102 in the extended configuration, transferring the unfilled container 1120 from the first elevator 902 onto the platform 1102. For example, the platform may be sized and shaped to pass through an opening formed in the first elevator to engage with and support the container as the first elevator moves downwards past the platform. However, other embodiments using different transfer systems (e.g., actuators, grippers, and/or any other appropriate method for transferring the containers between the elevator and platform) may be used as the disclosure is not so limited. The second elevator 904 may either move in sync or out of sync with the first elevator during this process.

Turning to FIG. 11D, the platform 1102 containing the unfilled container 1120 may transition from the extended configuration to the retracted configuration. The unfilled container 1120 may be in a position to be filled by the produce harvester 100 when disposed on the platform 1102 in the retracted configuration. As shown in FIG. 11E, the unfilled container 1120 disposed on the platform 1102 in the retracted configuration may be filled with produce to become a filled container 1122.

After filling, the platform 1102 containing the filled container 1122 may transition from the retracted configuration to the extended configuration, see FIG. 11F. The filled container 1122 may be vertically aligned with the first elevator 902 while disposed on the platform 1102 in the extended configuration. The first elevator 902 may then move to a position above the platform 1102, picking the filled container 1122 up such that the filled container 1122 is disposed on the first elevator 902, see FIG. 11G. The second elevator 904 may either move in sync with, out of sync with, or be held stationary during this process. After transferring the container to the first elevator, as seen in FIG. 11H, the platform 1102 may transition from the extended configuration to the retracted configuration. The first elevator 902 with the filled container 1122 disposed thereon and the second elevator 904 may then move adjacent to a shelf, see FIG. 11I. One or more unfilled containers, including a third unfilled container 1130, may be disposed on the adjacent shelf proximate to the second elevator 904.

Turning to FIG. 11J, the filled container 1122 may be moved from the first elevator 902 onto the adjacent shelf (e.g., using a container actuator or other appropriate arrangement). The movement of the filled container into the shelf may correspondingly move the third unfilled container 1130 onto the second elevator 904. The empty first elevator 902 and the second elevator 904 containing the third unfilled container 1130 may then move adjacent to a different shelf containing unfilled containers, see FIG. 11K. The elevators may move either in sync or out of sync with one another as the disclosure is not so limited. In some instances, the first unfilled container 1110 and a fourth unfilled container 1140 may be disposed on the adjacent shelf. As the third unfilled container 1130 is moved from the second elevator 904 through a second opening onto the adjacent shelf, the one or more containers disposed in the shelf (e.g., the first unfilled container 1110 and 1140) may be moved towards the first elevator 902 such that the fourth unfilled container 1140 disposed adjacent to the first elevator 902 on the shelf is moved onto the first elevator. The sequence shown in FIGS. 11A-11L may be considered as a container transfer cycle, where one unfilled container contained in the packing cart becomes a filled container 1122 and is stored on a shelf. The filled container may be stored on any shelf, as the disclosure is not limited to the order in which containers on any particular shelf are filled and/or the order in which the shelves are filed.

Turning to FIG. 11M, a container filling cycle as described in FIGS. 11A-11L and the above paragraphs may be repeated one or more times to store one or more filled containers on the first shelf containing filled container 1122. In the shown embodiment, a second filled container 1192 and a third filled container 1194 may be disposed on the same shelf as the first filled container 1122. In the shown embodiment, the container filling cycles may be continued until the shelf containing filled containers 1122, 1192, and 1194 exclusively contains filled containers. Turning to FIG. 11N, after filling the first shelf, one or more a shelf filling cycle as described in FIG. 9M and the above paragraph may include repeating the container filling cycle until a shelf contains exclusively filled containers. Once a shelf filling cycle is complete, a different shelf may now begin a shelf filling cycle, beginning with a first container filling cycle. In the shown embodiment, the shelf containing filled containers 1122, 1192, and 1194 has experienced a complete shelf filling cycle, and the shelf proximate to the shelf containing filled containers 1122, 1192, and 1194 has started the shelf filling cycle. The proximate shelf contains two unfilled containers and a fourth filled container 1196, indicating that the proximate shelf has experienced a single container filling cycle.

The above method may be implemented by one or more controllers including at least one processor operatively coupled to the various controllable portions of a packing cart as disclosed herein. The method may be embodied as computer readable instructions stored on non-transitory computer readable memory associated with the at least one processor such that when executed by the at least one processor, the packing cart may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semicustom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A produce packing cart comprising:

a plurality of shelves disposed at different vertical positions, wherein each shelf of the plurality of shelves is configured to support one or more containers disposed therein, and wherein each shelf includes a first opening on a first side of the plurality of shelves and a second opening on a second side of the plurality of shelves opposite from the first side;

a first elevator associated with the first side of the plurality of shelves;

a second elevator associated with the second side of the plurality of shelves; and one or more actuators configured to move a container disposed on one of the first and second elevators into an adjacent shelf of the plurality of shelves, wherein the adjacent shelf is positioned adjacent to the first and second elevators, and wherein moving the container into the adjacent shelf moves one of the one or more containers disposed in the adjacent shelf onto the other of the first and second elevators.

2. The produce packing cart of claim 1, further comprising a plurality of wheels attached to a frame of the produce packing cart.

3. The produce packing cart of claim 2, wherein the plurality of wheels are configured to be engaged with corresponding rails.

4. The produce packing cart of claim 1, further comprising:

at least one processor operatively coupled with the first elevator, the second elevator, and the one or more actuators, wherein the at least one processor is configured to:

control the one or more actuators to move the container disposed on one of the first and second elevators into the adjacent shelf of the plurality of shelves, and wherein moving the container into the adjacent shelf moves one of the one or more containers disposed in the adjacent shelf onto the other of the first and second elevators.

5. The produce packing cart of claim 1, wherein the plurality of shelves includes a plurality of rails configured to slidingly support the one or more containers.

6. The produce packing cart of claim 1, further comprising a frame, wherein the plurality of shelves, the first elevator, and the second elevator are connected to the frame.

7. The produce packing cart of claim 1, further comprising an elevator actuator configured to move the first elevator and the second elevator.

8. The produce packing cart of claim 1, wherein the container is configured to house produce, and wherein the produce includes tomatoes.

* * * * *